(12) United States Patent
Gruber et al.

(10) Patent No.: US 11,631,215 B2
(45) Date of Patent: Apr. 18, 2023

(54) METHODS AND APPARATUS FOR EDGE COMPRESSION ANTI-ALIASING

(71) Applicant: QUALCOMM Incorporated, San Diego, CA (US)

(72) Inventors: Andrew Evan Gruber, Arlington, MA (US); Krishnaiah Gummidipudi, Bangalore (IN); Pavan Kumar Akkaraju, Bangalore (IN); Kalyan Kumar Bhiravabhatla, Bengaluru (IN); Ankit Kumar Singh, Bangalore (IN); Sharad Raj, Bengaluru (IN)

(73) Assignee: QUALCOMM Incorporated, San Diego, CA (US)

( * ) Notice: Subject to any disclaimer, the term of this patent is extended or adjusted under 35 U.S.C. 154(b) by 128 days.

(21) Appl. No.: 16/816,150

(22) Filed: Mar. 11, 2020

(65) Prior Publication Data

US 2021/0287427 A1 Sep. 16, 2021

(51) Int. Cl.
*G06T 15/50* (2011.01)
*G06T 1/20* (2006.01)
*G06T 15/00* (2011.01)
*G06T 7/00* (2017.01)
(Continued)

(52) U.S. Cl.
CPC ............. *G06T 15/503* (2013.01); *G06T 1/20* (2013.01); *G06T 7/0002* (2013.01); *G06T 15/005* (2013.01); *G06T 17/10* (2013.01); *G06T 17/205* (2013.01)

(58) Field of Classification Search
None
See application file for complete search history.

(56) References Cited

U.S. PATENT DOCUMENTS 5,343,558 A 8/1994 Akeley
5,872,902 A 2/1999 Kuchkuda et al.
(Continued)

FOREIGN PATENT DOCUMENTS

EP 2854108 A2 4/2015

OTHER PUBLICATIONS

Loren Carpenter, "The A-buffer, an Antialiased Hidden Surface Method", Jul. 1984, ACM, SIGGRAPH '84: Proceedings of the 11th annual conference on Computer graphics and interactive techniques, pp. 103-108.*

(Continued)

*Primary Examiner* — Robert Bader
(74) *Attorney, Agent, or Firm* — Procopio, Cory, Hargreaves & Savitch LLP

(57) ABSTRACT

The present disclosure relates to methods and apparatus for graphics processing. The present disclosure can calculate a center-edge distance of a first pixel, the center-edge distance of the first pixel equal to a distance from a first pixel center to one or more edges of a first primitive. Additionally, the present disclosure can store the center-edge distance of the first pixel when the first primitive is visible in a scene. The present disclosure can also determine an amount of overlap between the first pixel and the first primitive. Further, the present disclosure can blend a color of the first pixel with a color of a second pixel based on at least one of the center-edge distance of the first pixel or the amount of overlap between the first pixel and the first primitive.

46 Claims, 11 Drawing Sheets

(51) Int. Cl.
    *G06T 17/10*     (2006.01)
    *G06T 17/20*     (2006.01)

(56) References Cited

U.S. PATENT DOCUMENTS

| | | | | |
|---|---|---|---|---|
| 6,097,400 | A | * | 8/2000 | Dilliplane ............. G06T 11/001 345/443 |
| 9,251,607 | B1 | * | 2/2016 | Milne ................... G06T 11/203 |
| 2002/0167532 | A1 | | 11/2002 | Stroyan |
| 2005/0212806 | A1 | | 9/2005 | Koselj et al. |
| 2006/0082593 | A1 | | 4/2006 | Stevenson et al. |
| 2007/0109318 | A1 | | 5/2007 | Tuomi |
| 2013/0176330 | A1 | | 7/2013 | Crow |

OTHER PUBLICATIONS

D. Crisu, S.D. Cotofana, S. Vassiliadis, P. Liuha, "Efficient Hardware for Antialiasing Coverage Mask Generation", Jun. 19, 2004, IEEE, Proceedings Computer Graphics International, 2004.*

Hugh Malan, "Edge Antialiasing by Post-Processing", 2010, in GPU Pro: Advanced Rendering Techniques, edited by Wolfgang Engel, chapter 2.*

Fang Liu, Meng-Cheng Huang, Xue-Hui Liu, En-Hua Wu, "FreePipe: a Programmable Parallel Rendering Architecture for Efficient Multi-Fragment Effects", Feb. 2010, ACM, I3D '10: Proceedings of the 2010 ACM SIGGRAPH symposium on Interactive 3D Graphics and Games, pp. 75-82.*

Louis Bavoil, Steven P. Callahan, Aaron Lefohn, Joao L. D. Comba, Claudio T. Silva, "Multi-Fragment Effects on the GPU using the k-Buffer", Apr. 2007, ACM, I3D '07: Proceedings of the 2007 symposium on Interactive 3D graphics and games, pp. 97-104.*

Stanford, "Tutorial 1: Image Filtering", webpage, retrieved from https://ai.stanford.edu/~syyeung/cvweb/tutorial1.html on Jan. 14, 2022.*

International Search Report and Written Opinion—PCT/US2021/017198—ISA/EPO—dated Jun. 9, 2021.

Schilling A., "A New Simple and Efficient Antialiasing with Subpixel Masks," Computer Graphics, ACM, US, vol. 25, No. 4, Jul. 1, 1991 (Jul. 1, 1991), pp. 133-141, XP058211661, ISSN: 0097-8930, DOI: 10.1145/127719.122733, Sec. 2, A.1.2.

* cited by examiner

METHODS AND APPARATUS FOR EDGE COMPRESSION ANTI-ALIASING

TECHNICAL FIELD

The present disclosure relates generally to processing systems and, more particularly, to one or more techniques for graphics processing.

INTRODUCTION

Computing devices often utilize a graphics processing unit (GPU) to accelerate the rendering of graphical data for display. Such computing devices may include, for example, computer workstations, mobile phones such as so-called smartphones, embedded systems, personal computers, tablet computers, and video game consoles. GPUs execute a graphics processing pipeline that includes one or more processing stages that operate together to execute graphics processing commands and output a frame. A central processing unit (CPU) may control the operation of the GPU by issuing one or more graphics processing commands to the GPU. Modern day CPUs are typically capable of concurrently executing multiple applications, each of which may need to utilize the GPU during execution. A device that provides content for visual presentation on a display generally includes a GPU.

Typically, a GPU of a device is configured to perform the processes in a graphics processing pipeline. However, with the advent of wireless communication and smaller, handheld devices, there has developed an increased need for improved graphics processing.

SUMMARY

The following presents a simplified summary of one or more aspects in order to provide a basic understanding of such aspects. This summary is not an extensive overview of all contemplated aspects, and is intended to neither identify key elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a central processing unit (CPU), a graphics processing unit (GPU), or any apparatus that can perform graphics processing. The apparatus can calculate a center-edge distance of a first pixel of a plurality of pixels, the center-edge distance of the first pixel equal to a distance from a center of the first pixel to one or more edges of a first primitive of a plurality of primitives in a scene, where at least a portion of the first primitive can overlap the center of the first pixel. The apparatus can also determine whether the first primitive is visible in the scene. The apparatus can also determine whether a portion of the first pixel overlaps with at least one auxiliary primitive of the plurality of primitives. Additionally, the apparatus can calculate a distance from the center of the first pixel to one or more edges of the at least one auxiliary primitive when a portion of the first pixel overlaps with the at least one auxiliary primitive. The apparatus can also store the center-edge distance of the first pixel when the first primitive is visible in the scene. Moreover, the apparatus can store the distance from the center of the first pixel to the one or more edges of the at least one auxiliary primitive in an auxiliary buffer when a portion of the first pixel overlaps with the at least one auxiliary primitive. The apparatus can also determine whether the depth of the first primitive is less than or greater than the depth of the second primitive. The apparatus can also determine an amount of overlap between the first pixel and the first primitive. Further, the apparatus can update the amount of overlap between the first pixel and the first primitive when the at least one auxiliary primitive forms a mesh with the first primitive. The apparatus can also blend a color of the first pixel with a color of a second pixel based on at least one of the center-edge distance of the first pixel or the amount of overlap between the first pixel and the first primitive.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
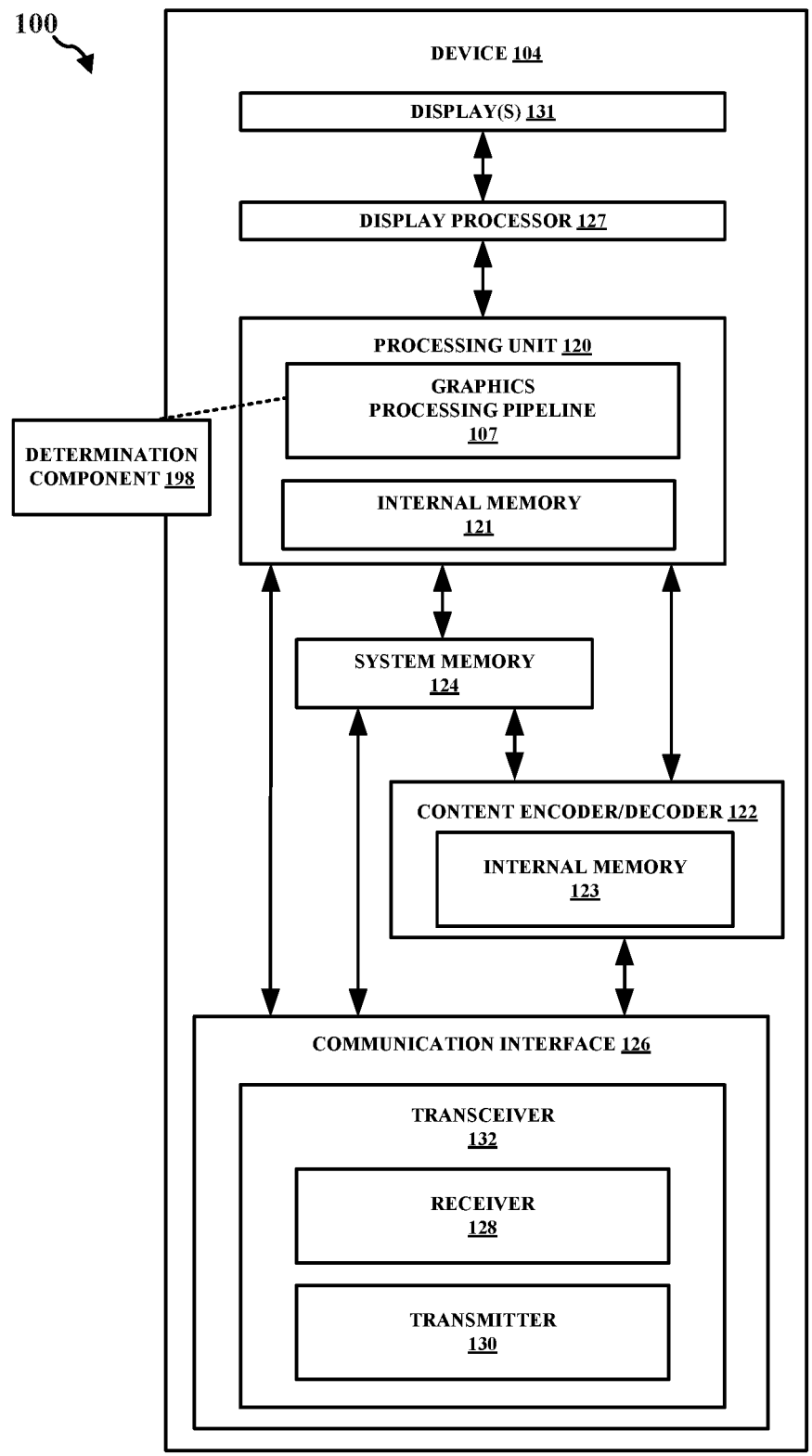
FIG. 1 is a block diagram that illustrates an example content generation system in accordance with one or more techniques of this disclosure.

A number of anti-aliasing methods can be used to solve pixel display issues, such as rough or jagged edges, by attempting to produce smoother pixels or images. However, some anti-aliasing methods can have increased performance overhead. Further, some anti-aliasing methods can have a large memory footprint due to storing large amounts of data. Also, some anti-aliasing methods may not support deferred shading, which is becoming more common in game engines for complex lighting scenes. Aspects of the present disclosure can utilize anti-aliasing methods that reduce the performance overhead and/or reduce the amount of data to be stored. For instance, aspects of the present disclosure can use anti-aliasing methods to smooth the displayed edges of pixels, while reducing the performance overhead and/or reducing the amount of data to be stored. Aspects of the present disclosure can propose a novel methodology where the GPU hardware computes the pixel-to-edge distance for each primitive based on the primitive geometry information that can also handle sub-pixel primitives, e.g., primitives that do not cover the center of a pixel but can contribute to the final average color of pixel. Aspects of the present disclosure can also allow users to custom blend pixel colors based on an edge distance. Techniques herein can also remove the limitations on deferred shading by preserving the pixel-to-edge distances for each of the geometry edges. The present disclosure can also include lower storage conditions than other anti-aliasing methods and/or reduce the performance overhead due to rendering while maintaining a high quality.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In general, this disclosure describes techniques for having a graphics processing pipeline in a single device or multiple devices, improving the rendering of graphical content, and/or reducing the load of a processing unit, i.e., any processing unit configured to perform one or more techniques described herein, such as a GPU. For example, this disclosure describes techniques for graphics processing in any device that utilizes graphics processing. Other example benefits are described throughout this disclosure.

As used herein, instances of the term "content" may refer to "graphical content," "image," and vice versa. This is true regardless of whether the terms are being used as an adjective, noun, or other parts of speech. In some examples, as used herein, the term "graphical content" may refer to a content produced by one or more processes of a graphics processing pipeline. In some examples, as used herein, the term "graphical content" may refer to a content produced by a processing unit configured to perform graphics processing. In some examples, as used herein, the term "graphical content" may refer to a content produced by a graphics processing unit.

In some examples, as used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of an SOC. The device 104 may include one or more components configured to perform one or more techniques of this disclosure. In the example shown, the device 104 may include a processing unit 120, a content encoder/decoder 122, and a system memory 124. In some aspects, the device 104 can include a number of optional components, e.g., a communication interface 126, a transceiver 132, a receiver 128, a transmitter 130, a display processor 127, and one or more displays 131. Reference to the display 131 may refer to the one or more displays 131. For example, the display 131 may include a single display or multiple displays. The display 131 may include a first display and a second display. The first display may be a left-eye display and the second display may be a right-eye display. In some examples, the first and second display may receive different frames for presentment thereon. In other examples, the first and second display may receive the same frames for presentment thereon. In further examples, the results of the graphics processing may not be displayed on the device, e.g., the first and second display may not receive any frames for presentment thereon. Instead, the frames or graphics processing results may be transferred to another device. In some aspects, this can be referred to as split-rendering.

The processing unit 120 may include an internal memory 121. The processing unit 120 may be configured to perform graphics processing, such as in a graphics processing pipeline 107. The content encoder/decoder 122 may include an internal memory 123. In some examples, the device 104 may include a display processor, such as the display processor 127, to perform one or more display processing techniques on one or more frames generated by the processing unit 120 before presentment by the one or more displays 131. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of: a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 and the content encoder/decoder 122 may be communicatively coupled to the system memory 124 over a bus. In some examples, the processing unit 120 and the content encoder/decoder 122 may be communicatively coupled to each other over the bus or a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, SRAM, DRAM, erasable programmable ROM (EPROM), electrically erasable programmable ROM (EEPROM), flash memory, a magnetic data media or an optical storage media, or any other type of memory.

The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a central processing unit (CPU), a graphics processing unit (GPU), a general purpose GPU (GPGPU), or any other processing unit that may be configured to perform graphics processing. In some examples, the processing unit 120 may be integrated into a motherboard of the device 104. In some examples, the processing unit 120 may be present on a graphics card that is installed in a port in a motherboard of the device 104, or may be otherwise incorporated within a peripheral device configured to interoperate with the device 104. The processing unit 120 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 can include an optional communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the graphics processing pipeline 107 may include a determination component 198 configured to calculate a center-edge distance of a first pixel of a plurality of pixels, the center-edge distance of the first pixel equal to a distance from a center of the first pixel to one or more edges of a first primitive of a plurality of primitives in a scene, where at least a portion of the first primitive can overlap the center of the first pixel. The determination component 198 can also be configured to determine whether the first primitive is visible in the scene. The determination component 198 can also be configured to determine whether a portion of the first pixel overlaps with at least one auxiliary primitive of the plurality of primitives. The determination component 198 can also be configured to calculate a distance from the center of the first pixel to one or more edges of the at least one auxiliary primitive when a portion of the first pixel overlaps with the at least one auxiliary primitive. The determination component 198 can also be configured to store the center-edge distance of the first pixel when the first primitive is visible in the scene. The determination component 198 can also be configured to store the distance from the center of the first pixel to the one or more edges of the at least one auxiliary primitive in an auxiliary buffer when a portion of the first pixel overlaps with the at least one auxiliary primitive. The determination component 198 can also be configured to determine whether the depth of the first primitive is less than or greater than the depth of the second primitive. The determination component 198 can also be configured to determine an amount of overlap between the first pixel and the first primitive. The determination component 198 can also be configured to update the amount of overlap between the first pixel and the first primitive when the at least one auxiliary primitive forms a mesh with the first primitive. The determination component 198 can also be configured to blend a color of the first pixel with a color of a second pixel based on at least one of the center-edge distance of the first pixel or the amount of overlap between the first pixel and the first primitive.

As described herein, a device, such as the device 104, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein. Processes herein may be described as performed by a particular component (e.g., a GPU), but, in further embodiments, can be performed using other components (e.g., a CPU), consistent with disclosed embodiments.

GPUs can process multiple types of data or data packets in a GPU pipeline. For instance, in some aspects, a GPU can process two types of data or data packets, e.g., context register packets and draw call data. A context register packet can be a set of global state information, e.g., information regarding a global register, shading program, or constant data, which can regulate how a graphics context will be processed. For example, context register packets can include information regarding a color format. In some aspects of context register packets, there can be a bit that indicates which workload belongs to a context register. Also, there can be multiple functions or programming running at the same time and/or in parallel. For example, functions or programming can describe a certain operation, e.g., the color mode or color format. Accordingly, a context register can define multiple states of a GPU.

Context states can be utilized to determine how an individual processing unit functions, e.g., a vertex fetcher (VFD), a vertex shader (VS), a shader processor, or a geometry processor, and/or in what mode the processing unit functions. In order to do so, GPUs can use context registers and programming data. In some aspects, a GPU can generate a workload, e.g., a vertex or pixel workload, in the pipeline based on the context register definition of a mode or state. Certain processing units, e.g., a VFD, can use these states to determine certain functions, e.g., how a vertex is assembled. As these modes or states can change, GPUs may need to change the corresponding context. Additionally, the workload that corresponds to the mode or state may follow the changing mode or state.

Figure 2:
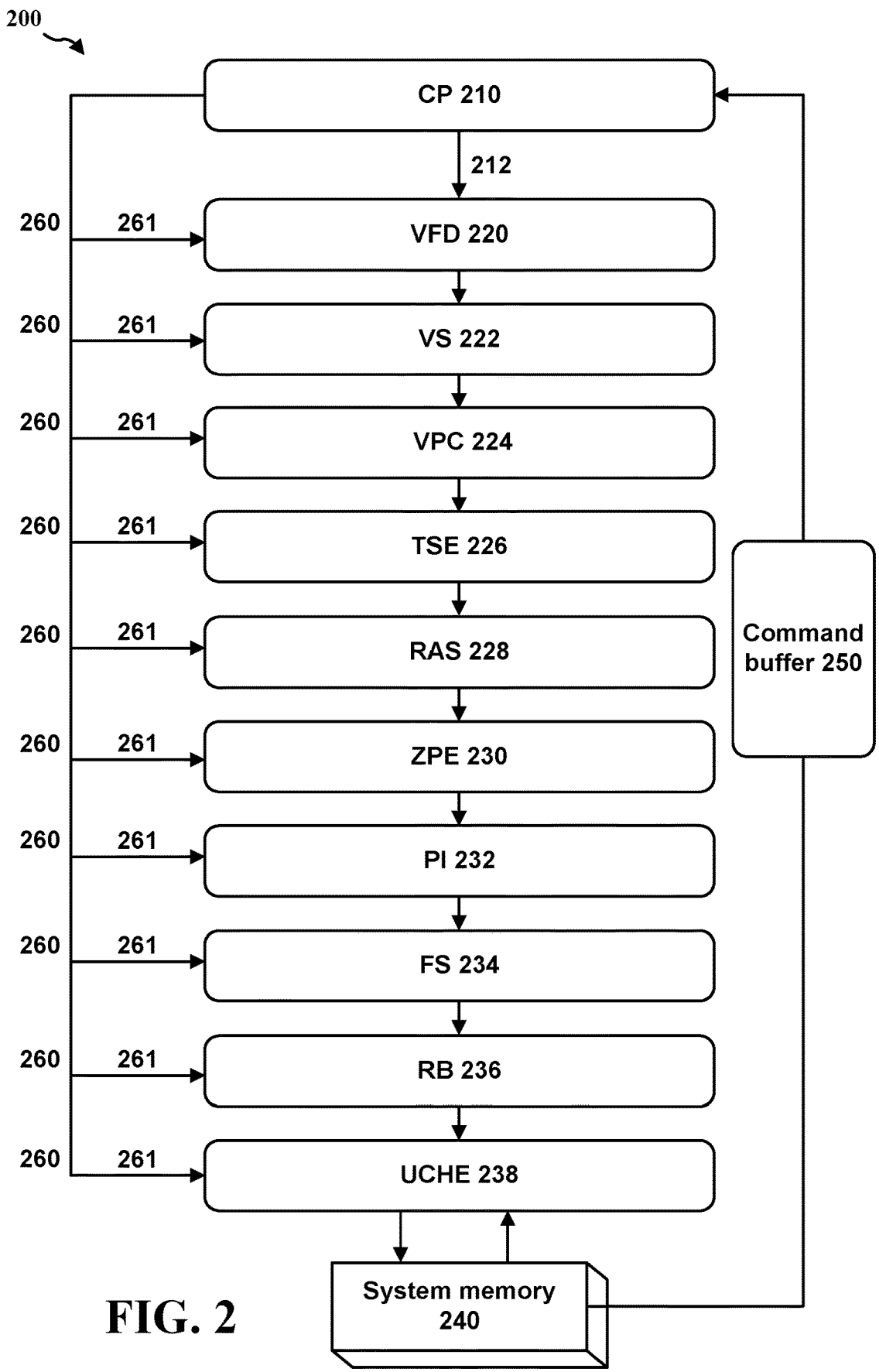
FIG. 2 illustrates an example GPU in accordance with one or more techniques of this disclosure.

FIG. 2 illustrates an example GPU 200 in accordance with one or more techniques of this disclosure. As shown in FIG. 2, GPU 200 includes command processor (CP) 210, draw call packets 212, VFD 220, VS 222, vertex cache (VPC) 224, triangle setup engine (TSE) 226, rasterizer (RAS) 228, Z process engine (ZPE) 230, pixel interpolator (PI) 232, fragment shader (FS) 234, render backend (RB) 236, L2 cache (UCHE) 238, and system memory 240. Although FIG. 2 displays that GPU 200 includes processing units 220-238, GPU 200 can include a number of additional processing units. Additionally, processing units 220-238 are merely an example and any combination or order of processing units can be used by GPUs according to the present disclosure. GPU 200 also includes command buffer 250, context register packets 260, and context states 261.

As shown in FIG. 2, a GPU can utilize a CP, e.g., CP 210, or hardware accelerator to parse a command buffer into context register packets, e.g., context register packets 260, and/or draw call data packets, e.g., draw call packets 212. The CP 210 can then send the context register packets 260 or draw call data packets 212 through separate paths to the processing units or blocks in the GPU. Further, the command buffer 250 can alternate different states of context registers and draw calls. For example, a command buffer can be structured in the following manner: context register of context N, draw call(s) of context N, context register of context N+1, and draw call(s) of context N+1.

GPUs can render images in a variety of different ways. In some instances, GPUs can render an image using rendering or tiled rendering. In tiled rendering GPUs, an image can be divided or separated into different sections or tiles. After the division of the image, each section or tile can be rendered separately. Tiled rendering GPUs can divide computer graphics images into a grid format, such that each portion of the grid, i.e., a tile, is separately rendered. In some aspects, during a binning pass, an image can be divided into different bins or tiles. In some aspects, during the binning pass, a visibility stream can be constructed where visible primitives or draw calls can be identified.

In some aspects, GPUs can apply the drawing or rendering process to different bins or tiles. For instance, a GPU can render to one bin, and perform all the draws for the primitives or pixels in the bin. During the process of rendering to a bin, the render targets can be located in the GMEM. In some instances, after rendering to one bin, the content of the render targets can be moved to a system memory and the GMEM can be freed for rendering the next bin. Additionally, a GPU can render to another bin, and perform the draws for the primitives or pixels in that bin. Therefore, in some aspects, there might be a small number of bins, e.g., four bins, that cover all of the draws in one surface. Further, GPUs can cycle through all of the draws in one bin, but perform the draws for the draw calls that are visible, i.e., draw calls that include visible geometry. In some aspects, a visibility stream can be generated, e.g., in a binning pass, to determine the visibility information of each primitive in an image or scene. For instance, this visibility stream can identify whether a certain primitive is visible or not. In some aspects, this information can be used to remove primitives that are not visible, e.g., in the rendering pass. Also, at least some of the primitives that are identified as visible can be rendered in the rendering pass.

In some aspects of tiled rendering, there can be multiple processing phases or passes. For instance, the rendering can be performed in two passes, e.g., a visibility or bin-visibility pass and a rendering or bin-rendering pass. During a visibility pass, a GPU can input a rendering workload, record the positions of the primitives or triangles, and then determine which primitives or triangles fall into which bin or area. In some aspects of a visibility pass, GPUs can also identify or mark the visibility of each primitive or triangle in a visibility stream. During a rendering pass, a GPU can input the visibility stream and process one bin or area at a time. In some aspects, the visibility stream can be analyzed to determine which primitives, or vertices of primitives, are visible or not visible. As such, the primitives, or vertices of primitives, that are visible may be processed. By doing so, GPUs can reduce the unnecessary workload of processing or rendering primitives or triangles that are not visible.

In some aspects, during a visibility pass, certain types of primitive geometry, e.g., position-only geometry, may be processed. Additionally, depending on the position or location of the primitives or triangles, the primitives may be sorted into different bins or areas. In some instances, sorting primitives or triangles into different bins may be performed by determining visibility information for these primitives or triangles. For example, GPUs may determine or write visibility information of each primitives in each bin or area, e.g., in a system memory. This visibility information can be used to determine or generate a visibility stream. In a rendering pass, the primitives in each bin can be rendered separately. In these instances, the visibility stream can be fetched from memory used to drop primitives which are not visible for that bin.

Some aspects of GPUs or GPU architectures can provide a number of different options for rendering, e.g., software rendering and hardware rendering. In software rendering, a driver or CPU can replicate an entire frame geometry by processing each view one time. Additionally, some different states may be changed depending on the view. As such, in software rendering, the software can replicate the entire workload by changing some states that may be utilized to render for each viewpoint in an image. In certain aspects, as GPUs may be submitting the same workload multiple times for each viewpoint in an image, there may be an increased amount of overhead. In hardware rendering, the hardware or GPU may be responsible for replicating or processing the geometry for each viewpoint in an image. Accordingly, the hardware can manage the replication or processing of the primitives or triangles for each viewpoint in an image.

Figure 3:
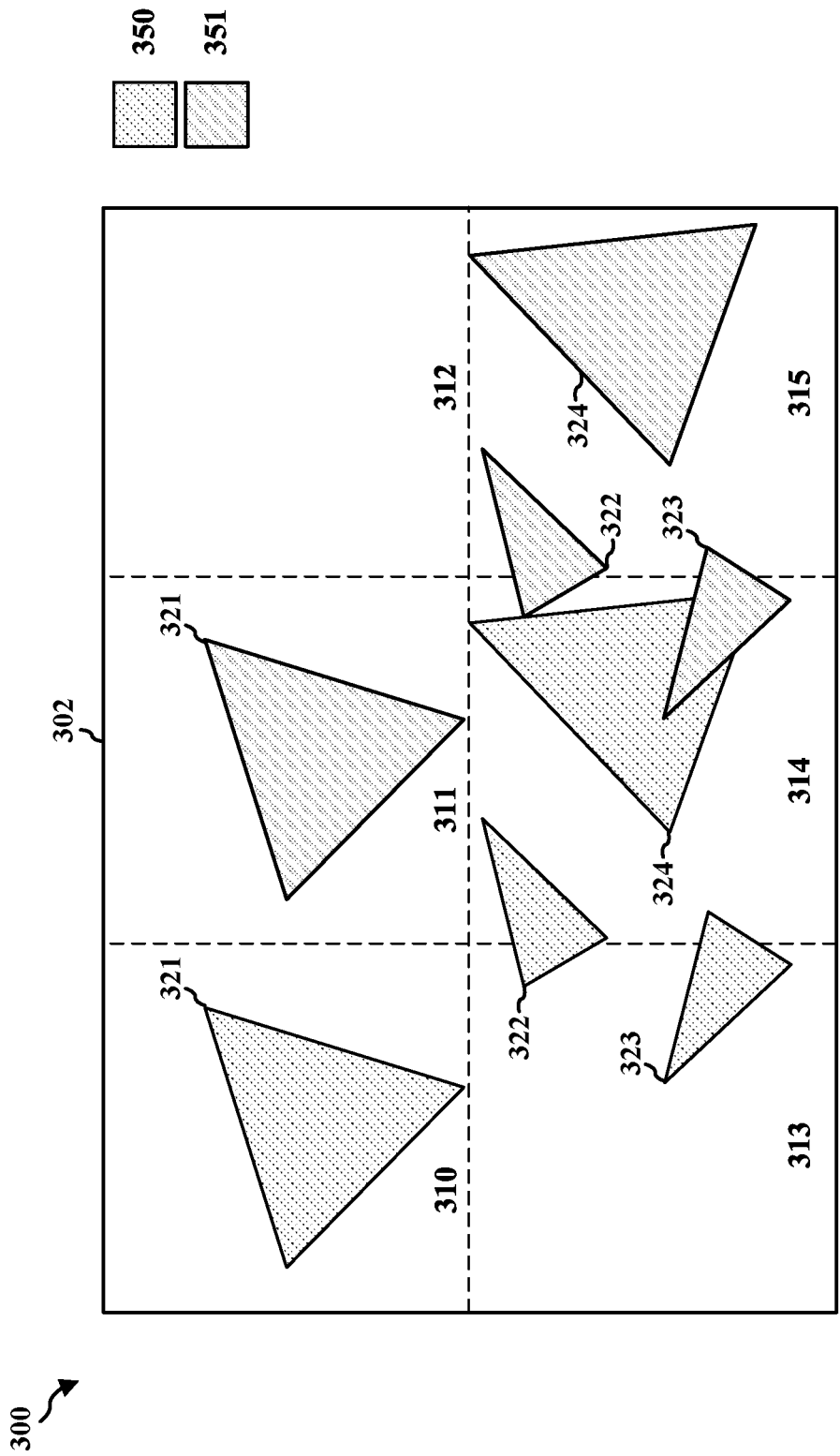
FIG. 3 illustrates an example image or surface in accordance with one or more techniques of this disclosure.

FIG. 3 illustrates image or surface 300, including multiple primitives divided into multiple bins. As shown in FIG. 3, image or surface 300 includes area 302, which includes primitives 321, 322, 323, and 324. The primitives 321, 322, 323, and 324 are divided or placed into different bins, e.g., bins 310, 311, 312, 313, 314, and 315. FIG. 3 illustrates an example of tiled rendering using multiple viewpoints for the primitives 321-324. For instance, primitives 321-324 are in first viewpoint 350 and second viewpoint 351. As such, the GPU processing or rendering the image or surface 300 including area 302 can utilize multiple viewpoints or multi-view rendering.

As indicated herein, GPUs or graphics processor units can use a tiled rendering architecture to reduce power consumption or save memory bandwidth. As further stated above, this rendering method can divide the scene into multiple bins, as well as include a visibility pass that identifies the triangles that are visible in each bin. Thus, in tiled rendering, a full screen can be divided into multiple bins or tiles. The scene can then be rendered multiple times, e.g., one or more times for each bin.

In aspects of graphics rendering, some graphics applications may render to a single target, i.e., a render target, one or more times. For instance, in graphics rendering, a frame buffer on a system memory may be updated multiple times. The frame buffer can be a portion of memory or random access memory (RAM), e.g., containing a bitmap or storage, to help store display data for a GPU. The frame buffer can also be a memory buffer containing a complete frame of data. Additionally, the frame buffer can be a logic buffer. In some aspects, updating the frame buffer can be performed in bin or tile rendering, wherein, as discussed above, a surface is divided into multiple bins or tiles and then each bin or tile can be separately rendered. Further, in tiled rendering, the frame buffer can be partitioned into multiple bins or tiles.

As indicated herein, in bin or tiled rendering architecture, frame buffers can have data stored or written to them repeatedly, e.g., when rendering from different types of memory. This can be referred to as resolving and unresolving the frame buffer or system memory. For example, when storing or writing to one frame buffer and then switching to another frame buffer, the data or information on the frame buffer can be resolved from the GPU internal memory (GMEM) at the GPU to the system memory, i.e., memory in the double data rate (DDR) RAM or dynamic RAM (DRAM).

In some aspects, the system memory can also be system-on-chip (SoC) memory or another chip-based memory to store data or information, e.g., on a device or smart phone. The system memory can also be physical data storage that is shared by the CPU and/or the GPU. In some aspects, the system memory can be a DRAM chip, e.g., on a device or smart phone. Accordingly, SoC memory can be a chip-based manner in which to store data.

In some aspects, the GMEM can be on-chip memory at the GPU, which can be implemented by static RAM (SRAM). Additionally, GMEM can be stored on a device, e.g., a smart phone. As indicated herein, data or information can be transferred between the system memory or DRAM and the GMEM, e.g., at a device. In some aspects, the system memory or DRAM can be at the CPU or GPU. Additionally, data can be stored at the DDR or DRAM. In bin or tiled rendering, a small portion of the memory can be stored at the GPU, e.g., at the GMEM. In some instances, storing data at the GMEM may utilize a larger processing workload and/or power consumed compared to storing data at the frame buffer or system memory.

In some aspects, GPUs can perform a tessellation or tessellation process. During a tessellation process, larger primitives can be divided into smaller sub-primitives or tessellated primitives. Tessellation can divide an image into more detailed sub-primitives or tessellated primitives, which can lead to a more detailed rendering process and more detailed graphical content. A tessellator can determine or generate the sub-primitives or tessellated primitives. In some aspects, one or more primitives can be grouped into a patch. A tessellator can then determine or generate a geometry-based tessellation of the patch, e.g., using triangles or rectangles, according to one or more tessellation parameters.

The tessellation process can allow for determining or generating a more detailed or smoother image or surface than would otherwise be generated based on the original patch of primitives. Additionally, tessellation can be used for implementing or rendering more detailed surfaces in an image. As mentioned above, the tessellation process can produce sub-primitives or tessellated primitives. These sub-primitives or tessellated primitives are generated as an output from the tessellation, e.g., based on one or more primitives or patches. These primitives can also be referred to as original or regular primitives, which are generated based on the original image or surface value. The determined or generated sub-primitives or tessellated primitives can be a more detailed version of the original primitive or patch. In some instances, each of the sub-primitives can be smaller than each of the primitives or patch. Accordingly, the original primitives may appear to be divided into the sub-primitives or tessellated primitives.

Figure 4:
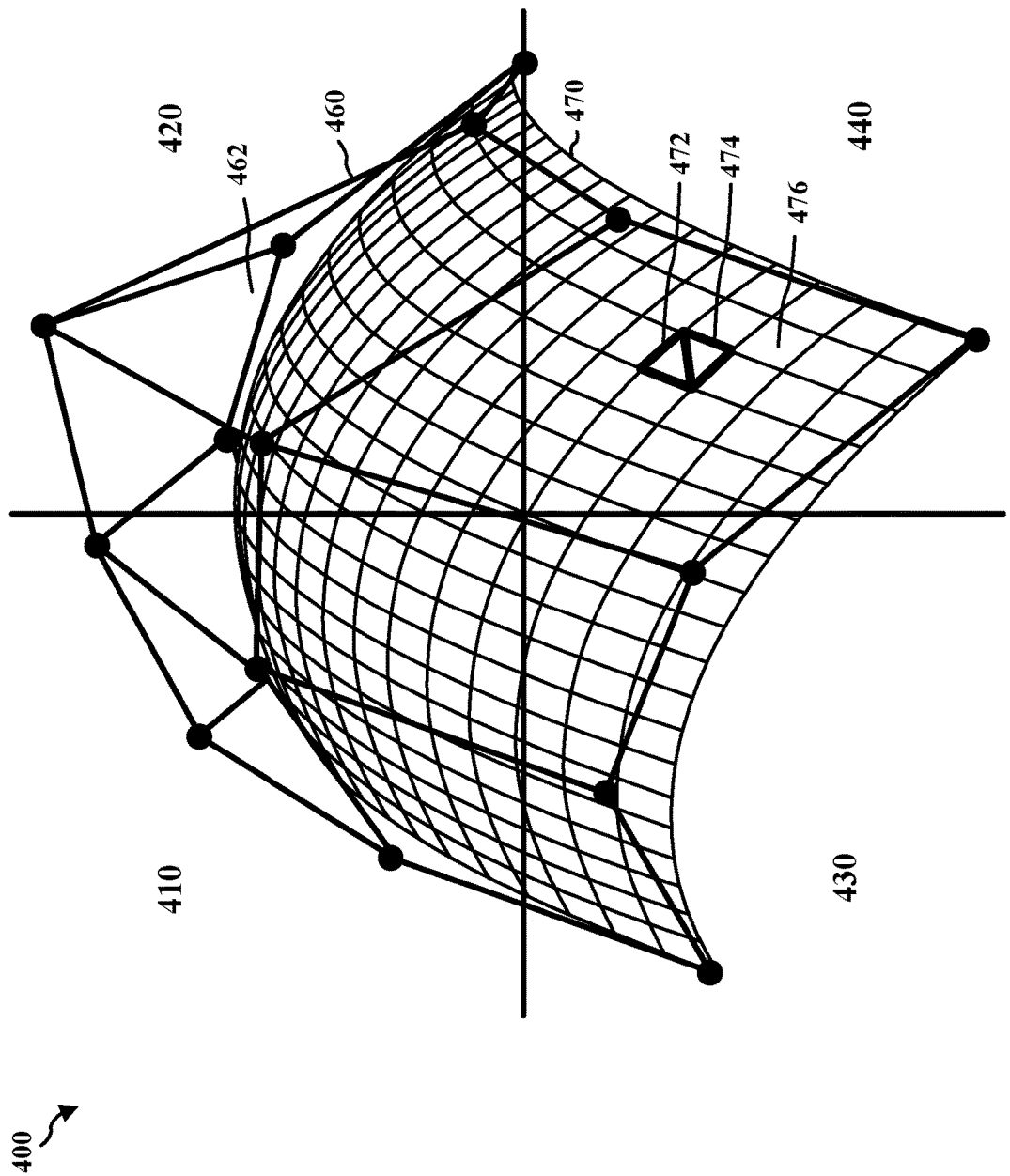
FIG. 4 illustrates an example image or surface in accordance with one or more techniques of this disclosure.

FIG. 4 illustrates an example image or surface 400 in accordance with one or more techniques of this disclosure. FIG. 4 illustrates that the image 400 is divided into multiple bins, e.g., bin 410, bin 420, bin 430, and bin 440. Also, FIG. 4 displays patch 460 which includes one or more primitives 462. In some aspects, patch 460 can be referred to as a group of primitives or one or more primitives. FIG. 4 also displays a plurality of sub-primitives 470 which includes sub-primitive 472, sub-primitive 474, and sub-primitive 476. As shown in FIG. 4, the individual sub-primitives in the plurality of sub-primitives 470 can be a number of different shapes such as rectangles, e.g., sub-primitive 476, or triangles, e.g., sub-primitives 472, 474.

FIG. 4 displays an example of the aforementioned tessellation process. For example, the original or input primitives, e.g., one or more primitives 462 in patch 460, are displayed as the larger triangles with the dots as vertices. The sub-primitives or tessellated primitives, e.g., sub-primitives 470, that are output from the tessellation process are displayed as the smaller rectangles or triangles on the surface 400, e.g., sub-primitives 472, 474, 476.

GPUs can render polygons by sampling objects at discrete pixel locations, which may cause an aliasing effect on the edges of the object. Anti-aliasing is a method for handling pixel display issues, such as rough or jagged edges, by smoothing the displayed edges of pixels. For example, multi-sample anti-aliasing (MSAA) is one of a number of anti-aliasing techniques used for smoothening pixel edges. This anti-aliasing technique relies on sampling the same pixel at multiple locations, e.g., 2, 4, 8, or 16 samples per pixel, and then determining what percentage of the pixel is inside or outside of an object. This information can be used later to blend pixel colors in order to smooth the rough pixel edges.

In order to use the aforementioned anti-aliasing techniques, each pixel may need up to four times more storage, e.g., in the case of MSAA-4x, and more computational overhead, e.g., approximately 10% more overhead. This can lead to a drop, e.g., a 25%-30% drop, in overall benchmark performance. Also, this technique may limit the user to apply deferred lighting algorithms, which can be used in rendering scenes with multiple light sources, as the sample level information may be lost when resolving the final frame buffer. Additionally, some game developers can provide distance-to-edge based algorithms as an alternative to MSAA, but they may be either software implementations based on post-processing pixels to detect edges or cannot handle sub-pixel primitives.

As mentioned above, several anti-aliasing methods can be used to solve pixel display issues, such as rough or jagged edges, by attempting to produce smoother images. However, these anti-aliasing methods, e.g., MSAA, can have an increased performance overhead. Further, these anti-aliasing methods can have a large memory footprint due to storing large amounts of data. Other use cases may specify higher performance overheads. Also, other anti-aliasing methods may not support deferred shading, which can be used in game engines for complex lighting scenes. Accordingly, there is a present need for anti-aliasing techniques that can reduce the performance overhead and/or reduce the amount of data to be stored.

Aspects of the present disclosure can utilize anti-aliasing methods that reduce the performance overhead and/or reduce the amount of data to be stored. For instance, aspects of the present disclosure can use anti-aliasing methods to smooth the displayed edges of pixels, while reducing the performance overhead and/or reducing the amount of data to be stored. Aspects of the present disclosure can propose a novel methodology where the GPU hardware computes the pixel-to-edge distance for each primitive based on primitive geometry information that can also handle sub-pixel primitives, i.e., primitives that do not cover the center of a pixel but can contribute to the final average color of pixel. Aspects of the present disclosure can also allow users to custom blend pixel colors based on the edge distance. Techniques herein can also removes the limitations on deferred shading by preserving the pixel-to-edge distances for each of the geometry edges. The present disclosure can also include lower storage conditions than other anti-aliasing methods, e.g., MSAA, and/or reduce the performance overhead due to rendering while maintaining a high quality.

As indicated above, aspects of the present disclosure can include an improved hardware accelerated anti-aliasing solution based on a pixel-to-edge distance that allows users to custom blend the pixel information for smoother edges of objects, e.g., including edges of sub-pixel primitives. This method can achieve quality close to other anti-aliasing methods, e.g., MSAA, with significantly lower storage conditions and/or reduced performance overhead. Some aspects of the present disclosure include edge compressed anti-aliasing (ECAA), which is a pixel-to-edge based implementation of anti-aliasing. ECAA algorithms according to the present disclosure can also implement pixel-to-edge based anti-aliasing using sub-pixel primitive distance using auxiliary edge (auxEdge) information, i.e., the distance to a sub-pixel primitive edge. Also, the bytes-per-pixel condition for anti-aliasing algorithms herein can be lower than other anti-aliasing methods, e.g., MSAA.

As indicated herein, the present disclosure can achieve a low overhead alternate solution to other anti-aliasing schemes and/or achieve the a high image quality while keeping the performance overhead low. The present disclosure can also include a novel hardware-accelerated anti-aliasing solution which can allow a user or application to choose between a number of supported anti-aliasing schemes. Upon choosing a distance-to-edge scheme, the driver can setup the hardware to compute the distance information during the render pass, which is stored along with other geometry buffer data. During the resolve operation, the present disclosure can invoke a post-processing shader which is based on an algorithm to blend neighboring pixels in order to alleviate any aliasing artifacts along the geometry edges.

Additionally, the distance-to-edge anti-aliasing solution of the present disclosure can include a number of key innovations which differentiate and improve upon existing approaches. Aspects of the present disclosure can also include anti-aliasing of sub-pixel primitives. For instance, the present disclosure can provide a scheme to handle such sub-pixel primitives by computing auxiliary edge data from such primitives which can be later used to improve the blending factors to handle coverage from sub-pixel primitives. Aspects of the present disclosure can also use geometry information from scenes to generate both a center edge and an auxiliary edge distance.

Moreover, the present disclosure can handle all types of primitives, e.g., regular and sub-pixel, by using conservative rasterization and/or storing auxiliary edge information from sub-pixels which cover any part of a pixel (and not covering a center sample) along with regular edges from primitives which cover the center of pixel. Aspects of the present disclosure can also include a hardware acceleration technique, where computing the edge distance in software can introduce an additional rendering pass to render the complete geometry and/or calculate the distance to edges before it is consumed by a post-processing pass. For instance, the present disclosure can compute the distance-to-edge information during the rendering pass with minimal hardware overhead and provide the edge data to the post-processing pass. As such, the performance impact to compute the edge distance in the hardware can be minimal.

Aspects of the present disclosure can also include a novel scheme to compress the edge data. Based on an observation that two edges per pixel may be sufficient to cover a majority, e.g., more than 99%, of geometry edge information for blending, the present disclosure can compress the edge data for improved hardware efficiency while maintaining quality levels. In some aspects, blend algorithms herein can blend neighboring pixel colors depending on the coverage of a pixel by a visible primitive, as well as use a z-value of neighboring pixels to fine tune blend factors. This novel blend algorithm herein can provide smooth blending across neighboring pixel colors and account for aliased edges. Aspects of the present disclosure can also be applicable to silhouette edges or all primitive edges. Also, aspects of the present disclosure can include a number of enhancements to the binning architecture to accommodate the algorithm. For instance, the hardware solution herein can enhance the existing underlying binning architecture using an expanded bin concept and/or utilize an on-chip geometry buffer for storing edge data.

In some aspects, when a pixel is partially covered by a primitive, the color of the pixel can be determined by the sample coverage. In some anti-aliasing methods, e.g., MSAA-1x, the sample position is the center of the pixel which can determine the color for entire pixel. In other anti-aliasing methods, e.g., MSAA-4x, four sample positions are evaluated for coverage and a blend of these colors can be the final pixel color. Also, in a distance based approach, the pixel area covered by the primitive can be used as blend factor with neighboring pixels. As such, in MSAA-1x, the pixel color (pixColor) is the color of primitive covering the center of pixel. In MSAA-4x, the pixel color is a blend of colors based on coverage of four samples. In ECAA methods herein, the pixel color can be a blend of neighboring pixel colors based on area coverage, where the blend factor is the percentage of area covered. In some aspects, a pixel edge can be measured either horizontally or vertically.

Figure 5:
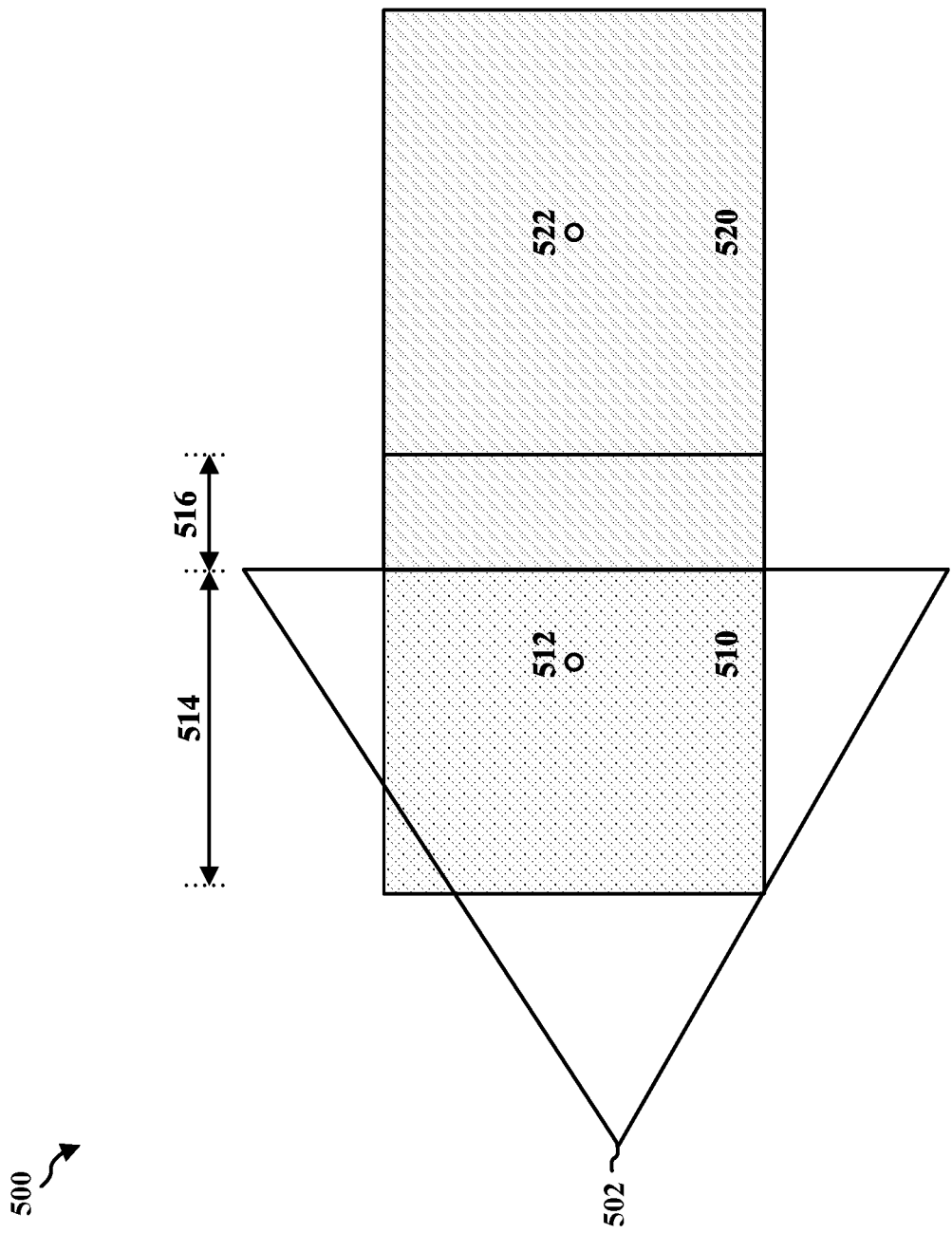
FIG. 5 illustrates an example scene including pixels and a primitive in accordance with one or more techniques of this disclosure.

FIG. 5 illustrates scene 500 including pixels and a primitive in accordance with one or more techniques of this disclosure. As shown in FIG. 5, scene 500 includes primitive 502, pixel 510, pixel center 512, pixel 520, and pixel center 522. Scene 500 also includes distance 514 and distance 516. As shown in FIG. 5, distance 514 is the width of pixel 510 that includes a light gray spotted pattern, e.g., 60% of pixel 510. Distance 516 is the width of pixel 510 that includes a slanted gray line pattern, e.g., 40% of pixel 510.

As shown in FIG. 5, pixel 510 is partially covered by primitive 502. Also, the center of pixel 510 is covered by the primitive 502. In ECAA methods herein, the distance from the pixel center to the edge of the primitive is evaluated to obtain blend factors. According to ECAA methods herein, the pixel center to primitive edge distance indicates a 60% coverage. As such, the color of pixel 510 can be blended as 60% light gray spotted pattern with 40% slanted gray line pattern.

In some aspects, upon choosing the pixel-to-edge distance scheme, the driver can setup the additional GPU hardware state to compute and/or store the additional edge distance information during the render pass. This additional edge information can be stored by the GPU along with other render target data, e.g., depth information and color information. Additionally, when the hardware rasterizer encounters a sub-pixel primitive, the pixel-to-edge distance can be updated to account for the new edge, i.e., an auxiliary edge, from the sub-pixel primitive. During the resolve operation, a custom post-processing shader can be invoked which uses the edge, depth, and/or color information to blend neighboring pixels to alleviate the aliasing artifacts.

Figure 6:
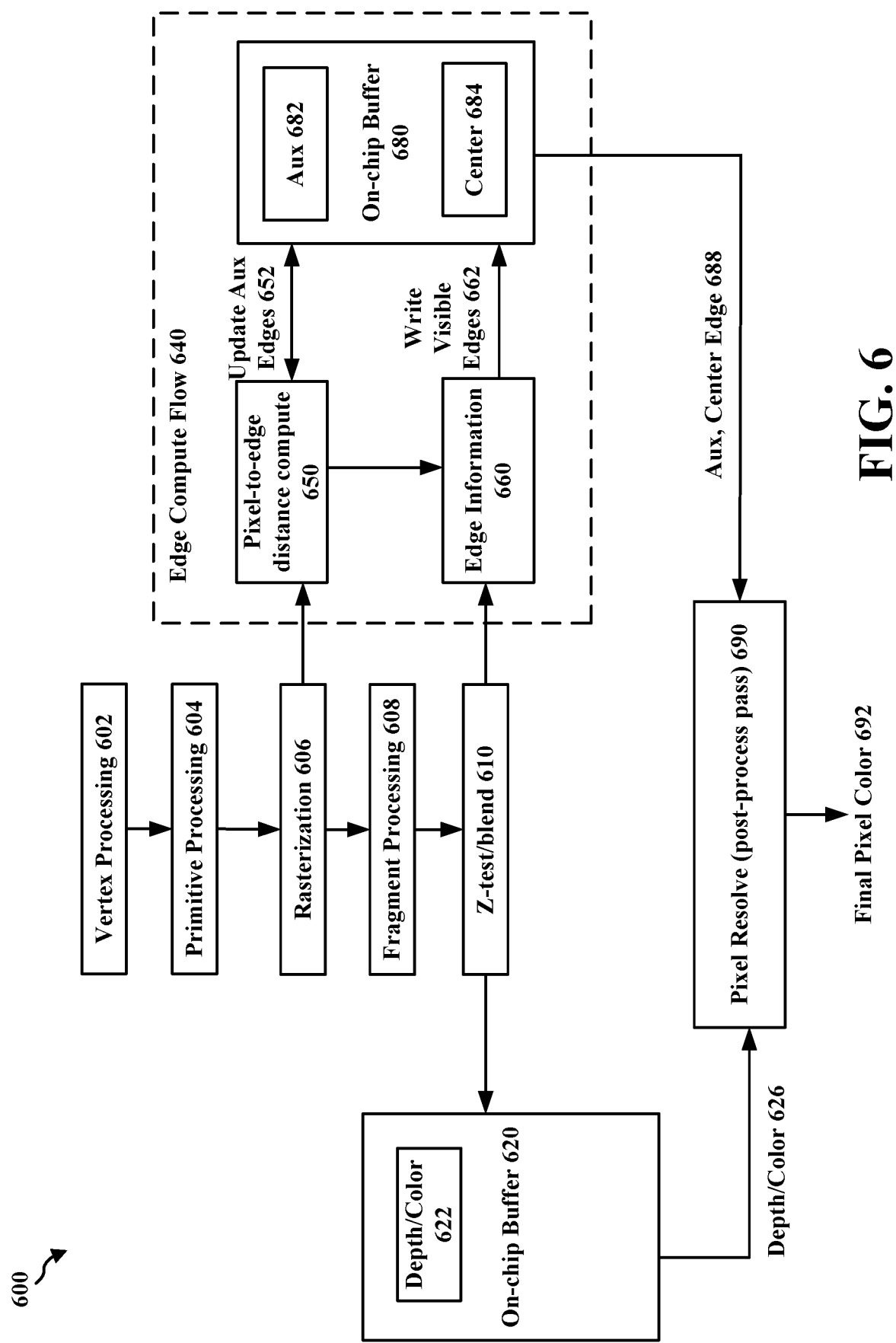
FIG. 6 illustrates an example diagram including an anti-aliasing approach in accordance with one or more techniques of this disclosure

FIG. 6 illustrates diagram 600 including an anti-aliasing approach in accordance with one or more techniques of this disclosure. As shown in FIG. 6, diagram 600 includes vertex processing unit 602, primitive processing unit 604, rasterization unit 606, fragment processing unit 608, Z-test or blend unit 610, on-chip buffer 620, which can include depth or color buffer 622, and pixel resolve unit 690, which can include a post-processing pass. Diagram 600 also includes an edge compute flow 640, which can include pixel-to-edge compute unit 650, edge information unit 660, and on-chip buffer 680, which can include auxiliary unit 682 and center unit 684.

As shown in FIG. 6, on-chip buffer 620 can send depth or color information 626 to pixel resolve unit 690. Also, pixel-to-edge compute unit 650 can send updated auxiliary edges 652 to on-chip buffer 680, and vice versa. Edge information unit 660 can send write visible edges 662 to on-chip buffer 680, and vice versa. Further, on-chip buffer 680 can set auxiliary information and center edge information 688 to pixel resolve unit 690. Based on the above, pixel resolve unit 690 can output the final pixel color 692. As shown in FIG. 6, this technique can estimate the pixel coverage using the distance of the pixel center to the primitive edge computation. In the present disclosure, the distance of the edge from the pixel center along the x-axis and the y-axis can be used for blending with the horizontal or vertical neighboring pixels, so the axial distances from the pixel center can also be computed.

Figure 7:
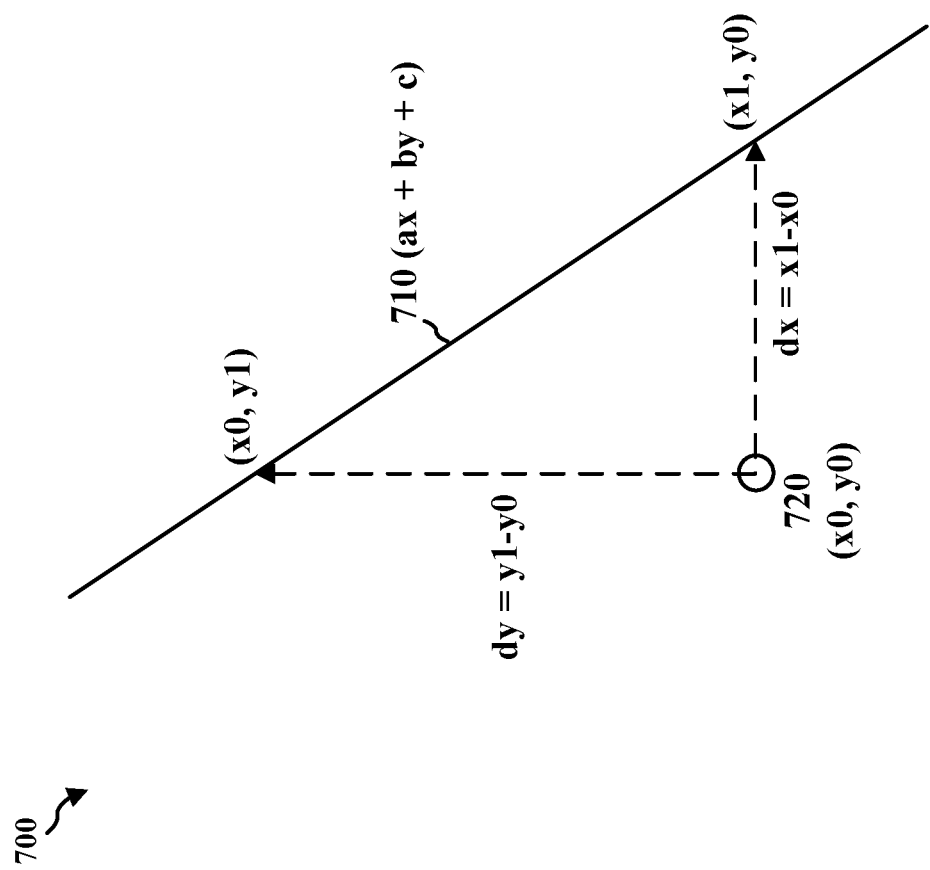
FIG. 7 illustrates an example diagram including an axial distance calculation in accordance with one or more techniques of this disclosure.

FIG. 7 illustrates diagram 700 including an axial distance calculation in accordance with one or more techniques of this disclosure. As shown in FIG. 7, diagram 700 includes an axial distance calculation for primitive edge 710 and pixel center 720. As displays in FIG. 7, the equation $(ax+by+c)$ can be used for primitive edge 710. Also, pixel center 720 can be $(x0, y0)$. The x-distance $(dx)$ and y-distance $(dy)$ from the pixel center 720 to the edge 710 are evaluated as follows. For example, evaluating $(x0, y0)$ with respect to edge 710 $(ax+by+c)$ can produce the distance d. Also, the sign of d can indicate whether the point is to the left or right of edge 710. Accordingly, the equation can be $ax0+by0+c=d$ (Eq1).

Additionally, if $(x1, y0)$ and $(x0, y1)$ are horizontal and vertical projections on the edge 710, these can be points on the line on the edge equation. Hence, the present disclosure can evaluate to zero: $ax1+by0+c=0$ (Eq2) and $ax0+by1+c=0$ (Eq3). Also, the present disclosure can compute the x, y axial distances to the line equation: (Eq1−Eq2)=>$dx=|x0−x1|=d/a$ and (Eq1−Eq3)=>$dy=|y0−y1|=d/b$.

Additionally, in the present disclosure, a 4-bit distance metric can be used. As such, the edges that are within a pixel distance, i.e., a distance between two adjacent pixel centers, can be used for blending. Any value beyond the pixel distance can be ignored and such distances can be represented by 0xF. Therefore, dx, dy in the interval of [0, 1] indicated as [0x0, 0xE] may be in equal or uniform steps. Further, dx, dy in the interval of [1, inf] can be indicated as 0xF.

In some aspects, for each pixel, additional edge storage information can be needed for storing distance information along four directions, e.g., top, left, bottom, and right directions. So the present disclosure can store the edge data for a pixel along four directions, e.g., top, left, bottom, and right directions. In the final visibility information, all the edge data for visible primitives can be stored. Additionally, the pixel to edge distance values are stored from the visible primitive (which pass a z-test) at the pixel. Thus, the final edge information stored at a pixel can be from the visible primitive covering the pixel center. This information can be stored in a buffer, e.g., an edge buffer.

Aspects of the present disclosure can also include a blend algorithm that works on the final color buffer after the render pass is complete. To compute the blend color of a pixel, the blend algorithm uses the color, edge and depth information available at each pixel and its four neighboring pixels. For example, the input can be a color buffer, a Z buffer, and an edge buffer. Also, the output can be a new color buffer. To blend colors between two adjacent pixels, blend factors can be calculated based on edge information available and their depth value. Depending on the distance, this algorithm can have multiple different scenarios, e.g., 10 scenarios, for blending, and in some cases z-information can be used to determine blend factors.

Figure 8:
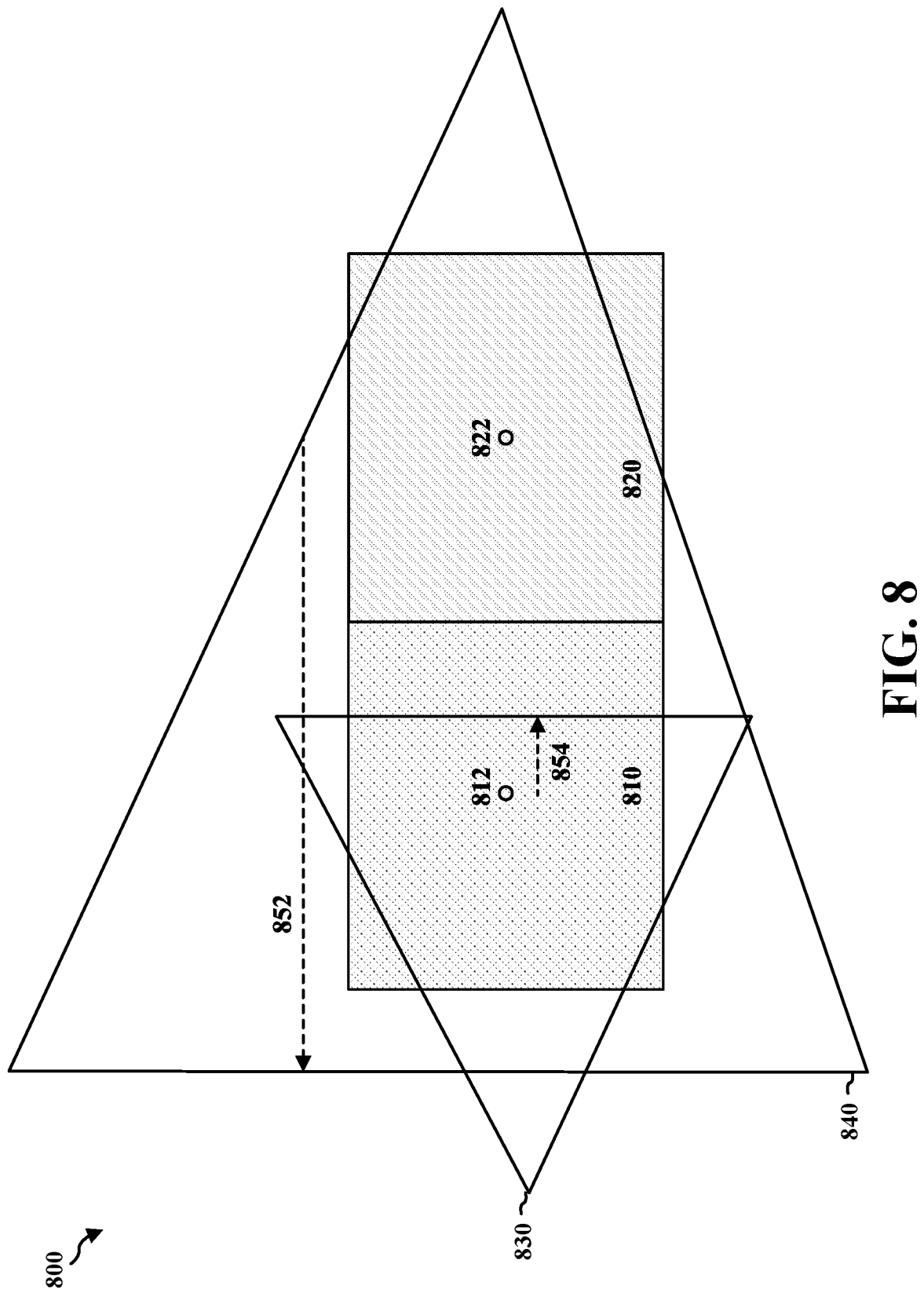
FIG. 8 illustrates an example scene including pixels and primitives in accordance with one or more techniques of this disclosure.

FIG. 8 illustrates scene 800 including pixels and primitives in accordance with one or more techniques of this disclosure. As shown in FIG. 8, scene 800 includes pixel 810, pixel center 812, pixel 820, pixel center 822, primitive 830, and primitive 840. Scene 800 also includes distance 852 and distance 854. As shown in FIG. 8, distance 854 is the distance from pixel center 812 to the edge of primitive 830 toward pixel 820. Also, distance 852 is the distance from pixel center 822 to the edge of primitive 840 toward pixel 810.

As shown in FIG. 8, pixel 810 is partially covered by primitive 830. Also, the center of pixel 810, e.g., pixel center 812, is covered by the primitive 830. As further shown in FIG. 8, pixel 820 is partially covered by primitive 840. Also, the center of pixel 820, e.g., pixel center 822, is covered by the primitive 840. In some aspects, the distance between pixel center 812 and pixel center 822 can be considered as a value of 1. Further, the Z-value of pixel 810 and pixel 820 can determine which primitive is in front of the other. As such, when blending two different pixels, e.g., pixel 810 and pixel 820, the present disclosure can determine the coverage area for a pixel based on the visible primitive. This can be done for each of the multiple pixels.

In some rasterization algorithms, the pixel centers which are part of the primitive can be rasterized. If a primitive covers one of the pixel center of adjacent pixels, the edge value is recorded as part of pixel edge information. However, there may be primitives which cover part of a single pixel or two adjacent pixels but do not cover the center of either pixel. Such primitives, whose width is less than a pixel distance and/or not recorded by either of the pixels, may lead to artifacts during the blend with neighboring pixels.

For example, consider triangles T1 and T2 along with the pixels (0,0), (1,0), (0,1) and (1,1). T2 partially covers the pixels (0,0) and (1,0). Hence in an ideal blend case, the color of T2 should be blended (partially) into the colors of these pixels. ECAA methods herein can also handle the blending based on a number of distances. For instance, the left and right distances measured as follows (0xF, 15=pixel distance). For Pix (0,0) and Pix (1,0), there may be no edges recorded and L=15, R=15 (default value). Also, for Pix (0,1), R=2 and L=13. For Pix (1,1), R=15 and L=2. Based on the blend algorithm, ECAA can blend the following cases: Pix (0,0)=blend with a right pixel, Pix (1,1)=blend with a left pixel, Pix [(1,0),(0,1)]=no blend. In some instances, this can lead to an inversion of blend colors.

To handle such cases in ECAA, there may be a need to consider coverage from sub-pixel primitives for computing blend factors. This can result in rasterization that is conservative, i.e., a pixel may need to be rasterized if a primitive covers it partially irrespective of whether its pixel center is covered. This can allow the processing of partial pixels. Additionally, the edge distance computation logic may need to be updated to handle sub-pixel primitives. This algorithm is further explained in detail herein.

In some aspects, for a given pixel, an auxiliary edge can be defined as a pair of edges of a primitive which may not cover the pixel center of a current pixel or its adjacent pixel. Such cases may occur when primitives are sub-pixel width and not covering the center of two adjacent pixels. An auxiliary primitive can be defined as a primitive which does not cover the center of two adjacent pixels and lies between the two pixel centers. This can be a part of one pixel or both pixels. For example, if d1 and d2 are distances to two edges from a pixel, then the primitive is an auxiliary primitive (auxPrimitive) if: auxPrimitive=(d1<pixDist) and (d2<pixDist). In some aspects, the present disclosure can store the two edges at distance d1 and d2 as an auxiliary pair in pixel P1. They can also be qualified as auxiliary edges of pixel P2, but in this algorithm they can be stored as part of a left (or top) pixel. Also, the present disclosure can store the two edges as auxiliary edges of pixel P2. Further, the edges may not be an auxiliary pair of edges for pixel P2, as it covers the pixel center for pixel P1.

In some aspects, for each pixel, additional storage can be allocated for storing the auxiliary edge information (auxEdge) along with edge information of primitives covering the center of pixel (centerEdge). The auxiliary edge distance can be used to update the center edge distance value if the auxiliary primitive forms a mesh (or common edge) with a primitive covering the pixel center. This can ensure coverage from the sub-pixel primitives is also accounted for while computing blend factors with neighboring pixel colors.

Figure 9:
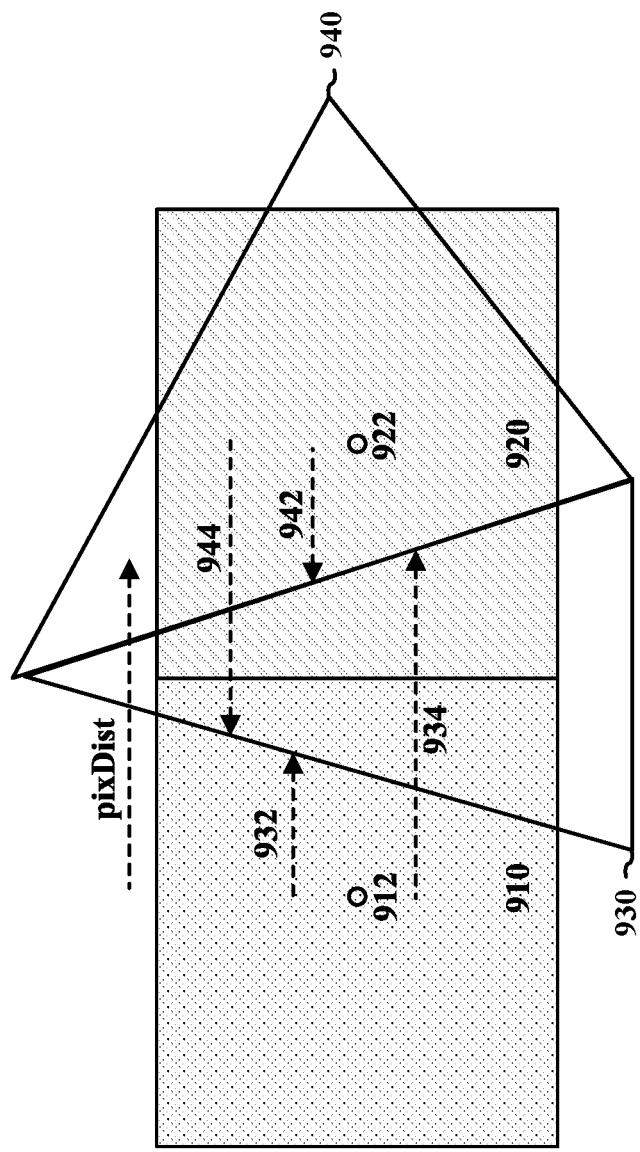
FIG. 9 illustrates an example scene including pixels and primitives in accordance with one or more techniques of this disclosure.

FIG. 9 illustrates scene 900 including pixels and primitives in accordance with one or more techniques of this disclosure. As shown in FIG. 9, scene 900 includes pixel 910, pixel center 912, pixel 920, pixel center 922, primitive 930, and primitive 940. Scene 900 also includes distance 932, distance 934, distance 942, and distance 944. These distances can be referred to as pixel distances (pixDist). As shown in FIG. 9, distance 932 is the distance from pixel center 912 to the edge of primitive 930 toward pixel 910. Also, distance 934 is the distance from pixel center 912 to the edge of primitive 930 toward pixel 920. Distance 942 is the distance from pixel center 922 to the edge of primitive 930 toward pixel 920. Also, distance 944 is the distance from pixel center 922 to the edge of primitive 930 toward pixel 910.

As shown in FIG. 9, pixel 910 is partially covered by primitive 930. Also, the center of pixel 910, e.g., pixel center 912, is not covered by the primitive 930. As further shown in FIG. 9, pixel 920 is partially covered by primitive 940. Also, the center of pixel 920, e.g., pixel center 922, is covered by the primitive 940.

In FIG. 9, primitives 930 and 940 may be rendered in a conservative way, which means any partially covered pixel is processed for edge computation even if its center is not covered by primitive. If primitives 930 and 940 are processed in that order, while rendering primitive 930, both pixels 910 and 920 are processed, since primitive 930 partially covers both pixels 910 and 920. In such a case, the present disclosure can choose to store the auxiliary edges as part of the auxiliary storage for pixel 910. While rendering primitive 940, pixel 920 can be processed for a computing center-edge distance as primitive 940 covers pixel center 922.

Rendering primitives 930 and 940 can result in the following distances for the pixel center, e.g., pixel center-to-edge (centerEdge) distance, auxiliary edge (auxEdge) distance, and/or auxiliary storages. After rendering primitive 930, pixel 910 can include auxEdge[P1][right]=(d1,d2) and centerEdge=NULL. Also, pixel 920 can include auxEdge=NULL and centerEdge=NULL. After rendering primitive 940, pixel 910 can include no changes to the previous state, auxEdge[P1][right]=(d1,d2) and centerEdge=NULL. Also, pixel 920 can include centerEdge [P2][left]=d3 and auxEdge=NULL.

In some aspects, during the post-processing of edges, mesh detection can be performed by comparing the auxiliary edge and center edge information between neighboring pixels. In this case, the present disclosure can check the following conditions to form a mesh (isMesh): isMesh=if (centerEdge[P2][left]+auxEdge[P1][right]==pixDist). If this condition evaluates to true, the center edge of pixel 920 can be updated by including the sub-primitive coverage centerEdge[P2][left]=pixDist−d1=d4.

In some aspects, the present disclosure can assume that the color of an auxiliary primitive is same as the primitive with which it forms a mesh. This can be a common case if the primitives or triangles belong to the same object. Also, it can be assumed that primitives or triangles from different objects rarely form a mesh, so clubbing auxiliary primitives from different objects may seldom happen. Also, multiple auxiliary primitives may not be common and empirical data may suggest that not more than one is present per pixel in a majority of pixels. Hence, the approach of storing one auxiliary edge per direction may be able to handle most of the practical scenarios and be a trade-off between hardware complexity and quality. Additionally, the current proposal can utilize one auxiliary storage per direction per pixel. Hence, ECAA with auxEdge storage herein can handle sub-pixel primitives and thereby alleviate any artifacts. Also, the bytes-per-pixel condition for ECAA techniques herein with auxiliary edges can be lower than other techniques, e.g., MSAA-4x.

Figure 10:
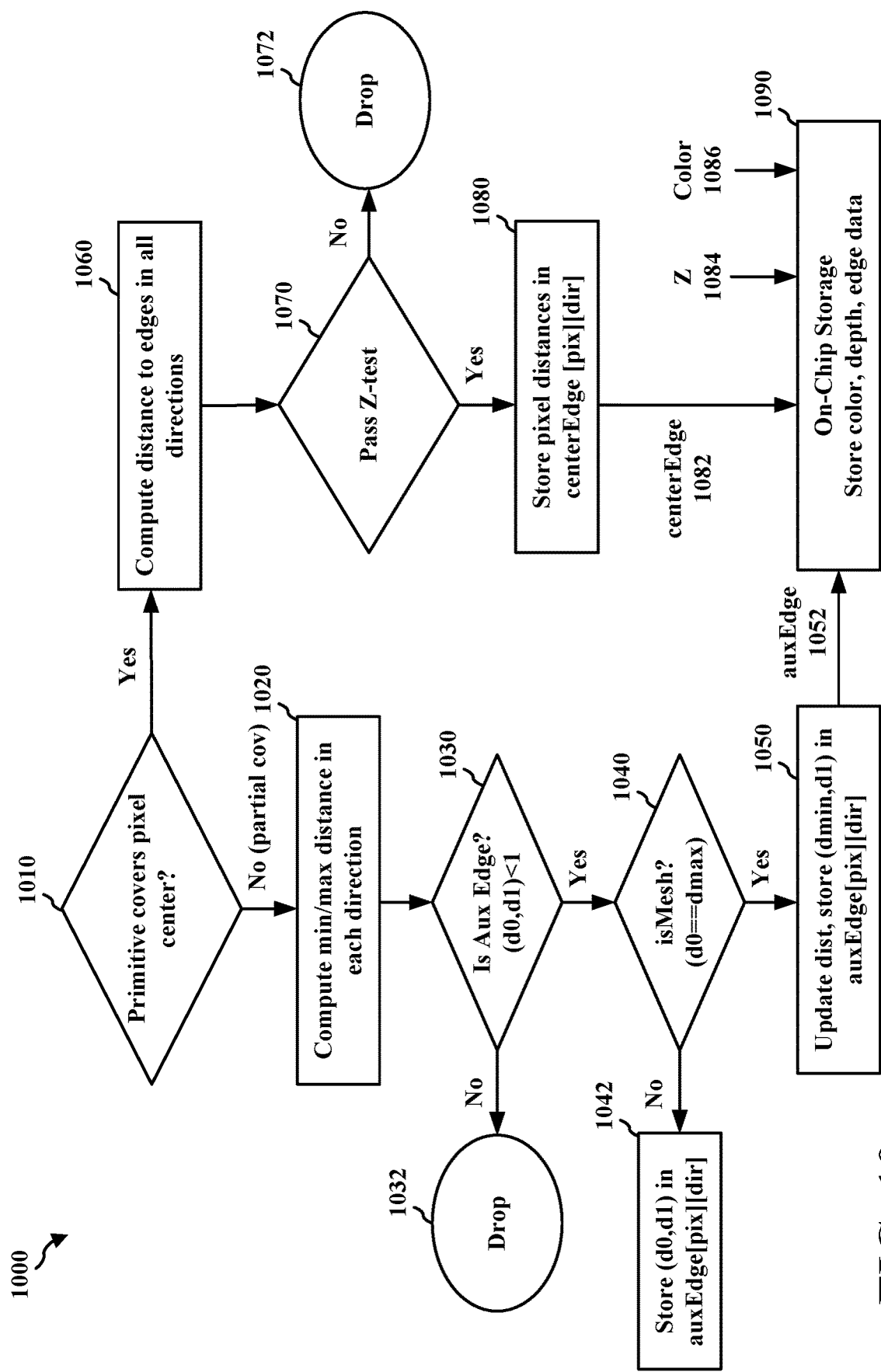
FIG. 10 illustrates an example diagram including an anti-aliasing approach in accordance with one or more techniques of this disclosure.

FIG. 10 illustrates diagram 1000 including an anti-aliasing approach in accordance with one or more techniques of this disclosure. As shown in FIG. 10, at 1010, the present disclosure determines whether a primitive covers a pixel center. If yes, at 1060, the present disclosure computes the distance to the edges of the primitive in all directions. If no, at 1020, the present disclosure computes the minimum and maximum distance in each direction.

At 1030, the present disclosure determines if an auxiliary edge (d0,d1) is less than 1. If no, at 1032, the present disclosure drops this edge information. If yes, at 1040, the present disclosure determines if the isMesh d0 is equal to dmax. If no, at 1042, the present disclosure stores (d0,d1) in an auxiliary edge for the pixel and direction. If yes, at 1050, the present disclosure updates the distance, stores (dmin,d1) in the auxiliary edge for the pixel and direction. Next, the present disclosure can send the auxiliary edge 1052 to the on-chip storage 1090.

At 1070, the present disclosure can determine if a Z-test is passed. If no, at 1072, the present disclosure drops this edge information. If yes, at 1080, the present disclosure stores the pixel distances in a centerEdge with both pixel and direction. The present disclosure can then send the centerEdge information 1082, the Z 1084, and the color 1086 to the on-chip storage 1090. The on-chip storage 1090 can store the color, depth, and/or edge data.

FIG. 10 displays the overall flow of edge computation described herein. For each pixel, the present disclosure can reserve additional storage in a geometry buffer which resides in on-chip storage 1090. In some aspects, 16-bit data per pixel may be needed to store centerEdge information and a 4-bit distance to primitive edge may be needed in each direction. This can also be computed for pixels whose centers are covered by the primitive. Also, 32-bit data per pixel may be needed to store auxEdge information. A pair of 4-bit edge distances may be needed in each direction. This can also be computed for pixels which are partially covered by primitives but their center is not covered.

As indicated above, conservative rasterization in a rasterizer block can process the pixels even if their pixel center is not covered by the primitive. In some aspects, if the pixel center is covered by the primitive, the centerEdge can be computed. If the pixel is partially covered by a primitive without covering its center, the auxEdge can be computed. Also, to compute the centerEdge value at a pixel for a given primitive, the axial distance is evaluated in x and y directions to the three edges from the pixel center. If there is more than one edge in one direction, the minimum among the distances can be stored. This center distance can be passed to downstream units, and if the primitive passes the Z-test for that pixel location, the centerEdge value can be written to an on-chip buffer, otherwise it may be dropped.

To compute the auxEdge value at a pixel for a given primitive, the x-y axial distance can be computed to edges from a pixel center. For an auxiliary primitive, there may be a pair of edges which are within a pixel distance (sub-pixel primitive). So the (min, max) edge distance pair in each direction can be stored when such edges are found. If an auxEdge is valid for a pixel, it can be compared with any existing auxEdge to check for a mesh formation. In such cases, the auxEdge distances can be updated for that direction. For example, if a pixel has (2, 4) as auxEdge in a left direction and a new auxEdge (4, 8) is encountered from the next primitive in same direction, then the auxEdge in the left direction can be updated to (2, 8). If it does not form a mesh, the latest value can be written to the auxEdge value. This updated auxEdge value can be stored in an on-chip buffer.

Once all render passes are completed, the edgeBuffer in on-chip buffer can include updated distances (centerEdge, auxEdge) for each pixel. This can then be used by the post-processing shader to update the color buffer by blending with neighboring pixels based on the edge data.

In some aspects, post-processing shaders herein can involve multiple steps, such as updating the center edge distance based on auxiliary edge data by checking the formation of a mesh between the primitives. This can also be blended with neighboring pixels along four directions. The blend factors can be independently computed with respect to each direction and the average pixel color can be computed.

As indicated above, anti-aliasing methods of the present disclosure can achieve high quality with reduced performance overheads and storage conditions. Compared to other anti-aliasing methods, the present disclosure can significantly reduce storage overhead. In some aspects, data from two directions (one from the horizontal axis and the other from the vertical axis) can be stored. So the amount of data storage can be reduced. This technique can also produce images of similar visual quality and fewer artifacts.

In some aspects, the present disclosure can detect sub-pixel primitives. The present disclosure can also update the pixel-to-edge distance buffers to account for the new edge information. Aspects of the present disclosure can also propose a new hardware architecture that computes the pixel-to-edge information based on the input geometry information, stores the same in an additional buffer, e.g., an edge buffer, by compressing the edge data, and updates the same when the GPU encounters a sub-pixel primitive.

As indicated above, some anti-aliasing schemes can blend a neighboring pixel color based on a coverage of pixels by visible primitives. Aspects of the present disclosure can utilize the depth value of neighboring pixels to fine tune blend factors and achieve better quality. This solution can be configurable to blend silhouette edge pixels or all primitive edge pixels. In the present disclosure, the blend algorithm can work on the final color buffer after the render pass is complete. In order to compute the blend color of a pixel, the present disclosure can use the color, edge, and/or depth information available at each pixel and its four neighboring pixels. As such, the input can be a color Buffer, a Z buffer, and an edge buffer. Additionally, the output can be a new color buffer.

To blend colors between two adjacent pixels, blend factors can be calculated based on edge information available and their depth value. Depending on the distance, the present algorithm can have 10 different scenarios for blending, and in some cases z-information can be used to determine blend factors. For example, blending of pixel A with pixel B can include: vector AB (the distance from pixel A to an edge which is towards the pixel B), vector BA (the distance from pixel B to an edge which is towards the pixel A), the distance between center of pixel A to center of pixel B can be considered as a value of 1, and the Z-value of pixel A and pixel B can determine which is in front for other. So the edge data for each of a plurality of pixels compared to adjacent primitives can be stored. Then this edge data can be utilized in a blending pass where the colors between two adjacent pixels are blended. As such, the blending pass can look at the coverage of neighboring pixels, and then blend the colors of the pixels and/or smooth the edges of the pixels based on the pixel coverage information.

Algorithms of the present disclosure can be implemented on tile-based GPU architectures with the additional advantages where the entire process is done on a per-tile basis. The present disclosure may choose to drop the edge information which can further enable bandwidth savings. Binning can be used with an algorithm when expanded bins are enabled. Expanded bins can extend further into adjacent bins, e.g., by 16 pixels. This adjacent pixel data can be used for blending. While binning, the present disclosure may need to know the pixel at boundary of bins to accurately blend along a boundary of the bins.

As indicated above, aspects of the present disclosure can achieve a high rendering quality with significantly lower storage conditions, e.g., a reduction of storage by 50%, and a reduced performance overhead, e.g., by over 30-50%. Aspects of the present disclosure can also detect the sub-pixel primitives and update the pixel-to-edge distance buffers to account for an auxiliary edge. Aspects of the present disclosure can also use depth information in a blend pass to achieve better anti-aliasing effects. Aspects of the present disclosure can also use edge buffers to develop custom post-processing algorithms for better visual quality.

Aspects of the present disclosure can handle sub-pixel primitives by a novel scheme of detecting such cases and updating the edge distance when mesh-formations are detected with sub-pixel primitives. This can ensure that the coverage due to small or thin triangles is not lost and hence artifacts due to these triangles may not be encountered. Aspects of the present disclosure can also include advanced post-processing algorithms, e.g., by detecting the edges before performing any anti-aliasing operations. Exposing the edge data in a geometry buffer to such resolve algorithms can improve the efficiency by quickly inferring the geometry edge information and may enable more sophisticated schemes.

FIGS. 5-10 illustrate examples of the aforementioned methods and processes for edge compression anti-aliasing (ECAA). As shown in FIGS. 5-10, aspects of the present disclosure, e.g., GPUs and CPUs herein, can perform a number of different steps or processes for ECAA in order to lower storage conditions and/or reduce performance overhead. For instance, GPUs herein can calculate a center-edge distance, e.g., distance 854, of a first pixel, e.g., pixel 810, of a plurality of pixels, the center-edge distance of the first pixel equal to a distance from a center of the first pixel, e.g., pixel center 812, to one or more edges of a first primitive, e.g., primitive 830, of a plurality of primitives in a scene, where at least a portion of the first primitive, e.g., primitive 830, can overlap the center of the first pixel, e.g., pixel center 812.

GPUs herein can also determine whether the first primitive, e.g., primitive 830, is visible in the scene. GPUs herein can also determine whether a portion of the first pixel, e.g., pixel 920, overlaps with at least one auxiliary primitive, e.g., primitive 930, of the plurality of primitives. Additionally, GPUs herein can calculate a distance from the center of the first pixel to one or more edges of the at least one auxiliary primitive, e.g., distance 942, when a portion of the first pixel, e.g., pixel 920, overlaps with the at least one auxiliary primitive, e.g., primitive 930.

GPUs herein can also store the center-edge distance, e.g., distance 854, of the first pixel, e.g., pixel 810, when the first primitive, e.g., primitive 830, is visible in the scene. In some aspects, the center-edge distance, e.g., distance 854, of the first pixel, e.g., pixel 810, can be stored in an edge buffer when the first primitive, e.g., primitive 830, is visible in the scene. Also, the center-edge distance, e.g., distance 854, of the first pixel, e.g., pixel 810, can be compressed when stored in the edge buffer.

Moreover, GPUs herein can store the distance from the center of the first pixel to the one or more edges of the at least one auxiliary primitive, e.g., distance 942, in an auxiliary buffer when a portion of the first pixel, e.g., pixel 920, overlaps with the at least one auxiliary primitive, e.g., primitive 930. GPUs herein can also determine whether the depth of the first primitive, e.g., primitive 830, is less than or greater than the depth of the second primitive, e.g., primitive 840.

GPUs herein can also determine an amount of overlap between the first pixel, e.g., pixel 810, and the first primitive, e.g., primitive 830. In some aspects, the amount of overlap between the first pixel, e.g., pixel 810, and the first primitive, e.g., primitive 830, may be determined based on at least one of the center-edge distance of the first pixel or a center-edge distance of the second pixel, e.g., pixel 820, where the center-edge distance of the second pixel may be equal to a distance from a center of the second pixel to one or more edges of a second primitive, e.g., primitive 840, of the plurality of primitives. In some instances, the amount of overlap between the first pixel, e.g., pixel 810, and the first primitive, e.g., primitive 830, may be determined based on a depth of the first primitive, e.g., primitive 830, and a depth of a second primitive, e.g., primitive 840, of the plurality of primitives. In some aspects, the amount of overlap between the first pixel, e.g., pixel 810, and the first primitive, e.g., primitive 830, can be equal to a portion of an area of the first pixel that overlaps with the first primitive. Further, GPUs herein can update the amount of overlap between the first pixel, e.g., pixel 920, and the first primitive, e.g., primitive 940, when the at least one auxiliary primitive, e.g., primitive 930, forms a mesh with the first primitive, e.g., primitive 940.

GPUs herein can also blend a color of the first pixel, e.g., pixel 810, with a color of a second pixel, e.g., pixel 820, based on at least one of the center-edge distance of the first pixel, e.g., distance 854, or the amount of overlap between the first pixel and the first primitive, e.g., primitive 830. In some aspects, the color of the first pixel, e.g., pixel 810, can be blended with the color of the second pixel, e.g., pixel 820, for a portion of the first pixel that does not overlap with the first primitive, e.g., primitive 830. Also, the first pixel, e.g., pixel 810, can be adjacent to the second pixel, e.g., pixel 820. In some instances, the color of the first pixel, e.g., pixel 810, can be equal to a color of the first primitive, e.g., primitive 830, and the color of the second pixel, e.g., pixel 820 can be equal to a color of the second primitive, e.g., primitive 840.

In some aspects, the center-edge distance, e.g., distance 854, can be calculated for each of the plurality of pixels, e.g., pixel 810, when one of the plurality of primitives, e.g., primitive 830, overlaps with the center of the pixel, e.g., pixel center 812. Additionally, the one or more edges of the first primitive, e.g., primitive 830, can include at least one of a top edge, a bottom edge, a left edge, and a right edge. The center-edge distance, e.g., distance 854, of the first pixel, e.g., pixel 810, can also be calculated in a rendering pass. Further, the plurality of primitives can include a plurality of sub-pixel primitives.

Figure 11:
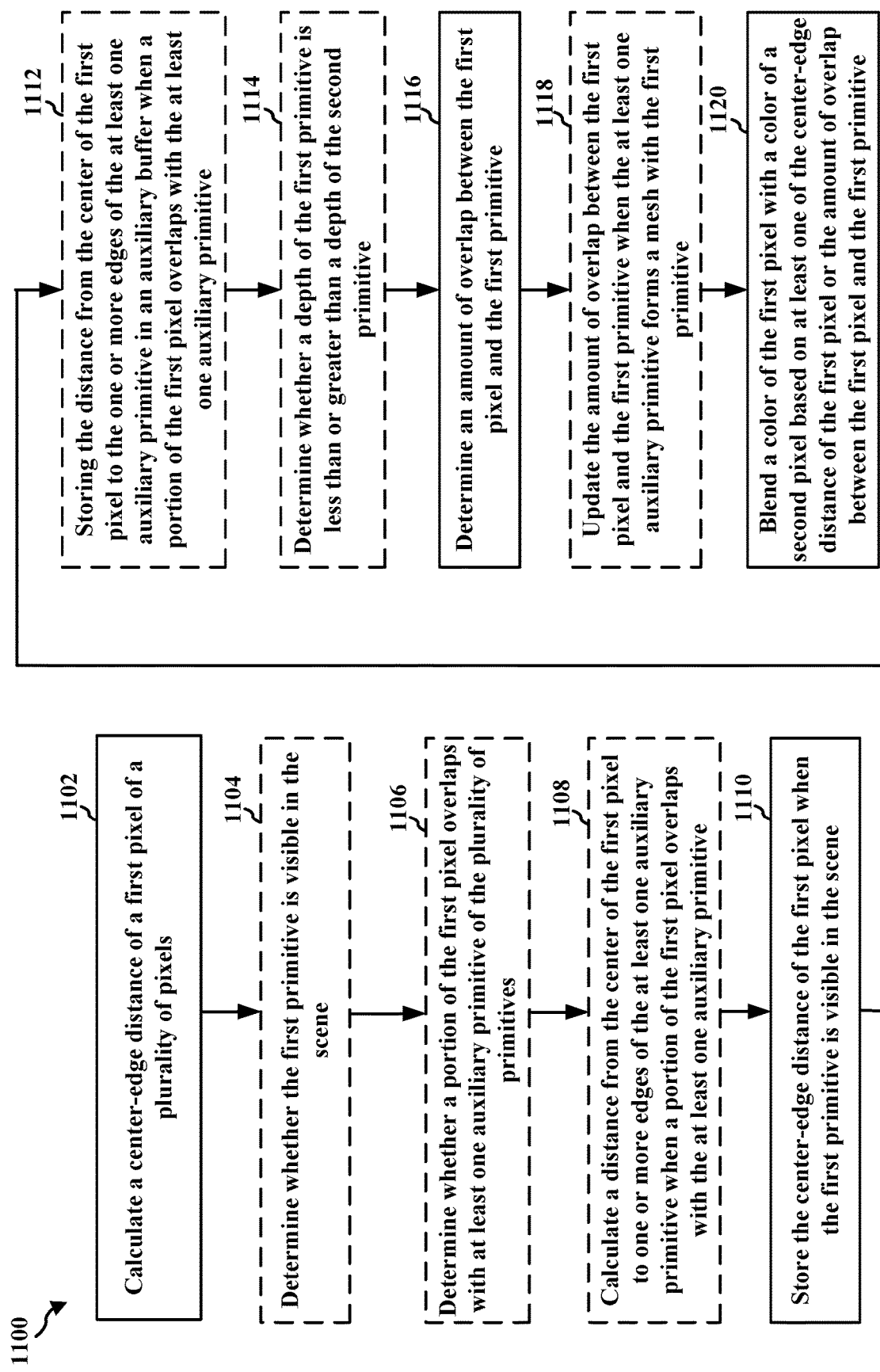
FIG. 11 illustrates an example flowchart of an example method in accordance with one or more techniques of this disclosure.

FIG. 11 illustrates a flowchart 1100 of an example method in accordance with one or more techniques of this disclosure. The method may be performed by an apparatus such as a CPU, a GPU, or an apparatus for graphics processing. At 1102, the apparatus may calculate a center-edge distance of a first pixel of a plurality of pixels, the center-edge distance of the first pixel equal to a distance from a center of the first pixel to one or more edges of a first primitive of a plurality of primitives in a scene, where at least a portion of the first primitive can overlap the center of the first pixel, as described in connection with the examples in FIGS. 5-10.

At 1104, the apparatus can determine whether the first primitive is visible in the scene, as described in connection with the examples in FIGS. 5-10. At 1106, the apparatus can determine whether a portion of the first pixel overlaps with at least one auxiliary primitive of the plurality of primitives, as described in connection with the examples in FIGS. 5-10. At 1108, the apparatus can calculate a distance from the center of the first pixel to one or more edges of the at least one auxiliary primitive when a portion of the first pixel overlaps with the at least one auxiliary primitive, as described in connection with the examples in FIGS. 5-10.

At 1110, the apparatus can store the center-edge distance of the first pixel when the first primitive is visible in the scene, as described in connection with the examples in FIGS. 5-10. In some aspects, the center-edge distance of the first pixel can be stored in an edge buffer when the first primitive is visible in the scene, as described in connection with the examples in FIGS. 5-10. Also, the center-edge distance of the first pixel can be compressed when stored in the edge buffer, as described in connection with the examples in FIGS. 5-10. At 1112, the apparatus can store the distance from the center of the first pixel to the one or more edges of the at least one auxiliary primitive in an auxiliary buffer when a portion of the first pixel overlaps with the at least one auxiliary primitive, as described in connection with the examples in FIGS. 5-10.

At 1114, the apparatus can determine whether the depth of the first primitive is less than or greater than the depth of the second primitive, as described in connection with the examples in FIGS. 5-10. At 1116, the apparatus can determine an amount of overlap between the first pixel and the first primitive, as described in connection with the examples in FIGS. 5-10. In some aspects, the amount of overlap between the first pixel and the first primitive may be determined based on at least one of the center-edge distance of the first pixel or a center-edge distance of the second pixel, where the center-edge distance of the second pixel may be equal to a distance from a center of the second pixel to one or more edges of a second primitive of the plurality of primitives, as described in connection with the examples in FIGS. 5-10. In some instances, the amount of overlap between the first pixel and the first primitive may be determined based on a depth of the first primitive and a depth of a second primitive of the plurality of primitives, as described in connection with the examples in FIGS. 5-10. In some aspects, the amount of overlap between the first pixel and the first primitive can be equal to a portion of an area of the first pixel that overlaps with the first primitive, as described in connection with the examples in FIGS. 5-10. At 1118, the apparatus can update the amount of overlap between the first pixel and the first primitive when the at least one auxiliary primitive forms a mesh with the first primitive, as described in connection with the examples in FIGS. 5-10.

At 1120, the apparatus can blend a color of the first pixel with a color of a second pixel based on at least one of the center-edge distance of the first pixel or the amount of overlap between the first pixel and the first primitive, as described in connection with the examples in FIGS. 5-10. In some aspects, the color of the first pixel can be blended with the color of the second pixel for a portion of the first pixel that does not overlap with the first primitive, as described in connection with the examples in FIGS. 5-10. Also, the first pixel can be adjacent to the second pixel, as described in connection with the examples in FIGS. 5-10. In some instances, the color of the first pixel can be equal to a color of the first primitive, and the color of the second pixel can be equal to a color of the second primitive, as described in connection with the examples in FIGS. 5-10.

In some aspects, the center-edge distance can be calculated for each of the plurality of pixels when one of the plurality of primitives overlaps with the center of the pixel, as described in connection with the examples in FIGS. 5-10. Additionally, the one or more edges of the first primitive can include at least one of a top edge, a bottom edge, a left edge, and a right edge, as described in connection with the examples in FIGS. 5-10. The center-edge distance of the first pixel can also be calculated in a rendering pass, as described in connection with the examples in FIGS. 5-10. Further, the plurality of primitives can include a plurality of sub-pixel primitives, as described in connection with the examples in FIGS. 5-10.

In one configuration, a method or apparatus for graphics processing is provided. The apparatus may be a CPU, a GPU, or some other processor that can perform graphics processing. In one aspect, the apparatus may be the processing unit 120 within the device 104, or may be some other hardware within device 104 or another device. The apparatus may include means for calculating a center-edge distance of a first pixel of a plurality of pixels, the center-edge distance of the first pixel equal to a distance from a center of the first pixel to one or more edges of a first primitive of a plurality of primitives in a scene, where at least a portion of the first primitive can overlap the center of the first pixel. The apparatus may also include means for storing the center-edge distance of the first pixel when the first primitive is visible in the scene. The apparatus may also include means for determining an amount of overlap between the first pixel and the first primitive based on a depth of the first primitive and a depth of a second primitive of the plurality of primitives. The apparatus may also include means for blending a color of the first pixel with a color of a second pixel based on at least one of the center-edge distance of the first pixel or the amount of overlap between the first pixel and the first primitive. The apparatus may also include means for determining whether a portion of the first pixel overlaps with at least one auxiliary primitive of the plurality of primitives. The apparatus may also include means for updating the amount of overlap between the first pixel and the first primitive when the at least one auxiliary primitive forms a mesh with the first primitive. The apparatus may also include means for calculating a distance from the center of the first pixel to one or more edges of the at least one auxiliary primitive when a portion of the first pixel overlaps with the at least one auxiliary primitive. The apparatus may also include means for storing the distance from the center of the first pixel to the one or more edges of the at least one auxiliary primitive in an auxiliary buffer when a portion of the first pixel overlaps with the at least one auxiliary primitive. The apparatus may also include means for determining whether the depth of the first primitive is less than or greater than the depth of the second primitive. The apparatus may also include means for determining whether the first primitive is visible in the scene.

The subject matter described herein can be implemented to realize one or more benefits or advantages. For instance, the described graphics processing techniques can be used by a GPU, a CPU, or some other processor that can perform graphics processing to implement the multi-pass tessellation techniques described herein. This can also be accomplished at a low cost compared to other graphics processing techniques. Moreover, the graphics processing techniques herein can improve or speed up data processing or execution. Further, the graphics processing techniques herein can improve resource or data utilization and/or resource efficiency. Additionally, aspects of the present disclosure can utilize ECAA techniques in order to lower storage conditions and/or reduce performance overhead.

In accordance with this disclosure, the term "or" may be interrupted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of interoperative hardware units, including one or more processors as described above, in conjunction with suitable software and/or firmware.

Various examples have been described. These and other examples are within the scope of the following claims.

What is claimed is:

1. A method of graphics processing, comprising:
calculating a center-edge distance of a first pixel of a plurality of pixels, the center-edge distance of the first pixel equal to a distance from a center of the first pixel to one or more edges of a first primitive of a plurality of primitives in a scene, wherein at least a portion of the first primitive overlaps the center of the first pixel;
determining whether a portion of the first pixel overlaps with at least one auxiliary primitive of the plurality of primitives;
calculating a distance from the center of the first pixel to one or more edges of the at least one auxiliary primitive when the portion of the first pixel overlaps with the at least one auxiliary primitive;
storing the center-edge distance of the first pixel when the first primitive is visible in the scene;
determining an amount of overlap between the first pixel and the first primitive; and
blending a color of the first pixel with a color of a second pixel based on the center-edge distance of the first pixel, the amount of overlap between the first pixel and the first primitive, the distance from the center of the first pixel to the one or more edges of the at least one auxiliary primitive, and depth information for the first pixel and the second pixel, wherein the color of the first pixel is blended with the color of the second pixel for a portion of the first pixel that is outside of an area of the first pixel that overlaps with the first primitive, wherein the first pixel is adjacent to the second pixel.

2. The method of claim 1, further comprising:
updating the amount of overlap between the first pixel and the first primitive when the at least one auxiliary primitive forms a mesh with the first primitive.

3. The method of claim 1, further comprising:
storing the distance from the center of the first pixel to the one or more edges of the at least one auxiliary primitive in an auxiliary buffer when the portion of the first pixel overlaps with the at least one auxiliary primitive.

4. The method of claim 1, further comprising:
determining whether a depth of the first primitive is less than or greater than a depth of a second primitive.

5. The method of claim 1, further comprising:
determining whether the first primitive is visible in the scene.

6. The method of claim 1, wherein the center-edge distance of the first pixel is stored in an edge buffer when the first primitive is visible in the scene.

7. The method of claim 6, wherein the center-edge distance of the first pixel is compressed when stored in the edge buffer.

8. The method of claim 1, wherein the amount of overlap between the first pixel and the first primitive is equal to the area of the first pixel that overlaps with the first primitive.

9. The method of claim 1, wherein the color of the first pixel is equal to a color of the first primitive, and the color of the second pixel is equal to a color of a second primitive.

10. The method of claim 1, wherein a center-edge distance is calculated for each of the plurality of pixels when one of the plurality of primitives overlaps with the center of the pixel.

11. The method of claim 1, wherein the one or more edges of the first primitive include at least one of a top edge, a bottom edge, a left edge, and a right edge.

12. The method of claim 1, wherein the center-edge distance of the first pixel is calculated in a rendering pass.

13. The method of claim 1, wherein the plurality of primitives include a plurality of sub-pixel primitives.

14. The method of claim 1, wherein the amount of overlap between the first pixel and the first primitive is determined based on at least one of the center-edge distance of the first pixel or a center-edge distance of the second pixel, wherein the center-edge distance of the second pixel is equal to a distance from a center of the second pixel to one or more edges of a second primitive of the plurality of primitives.

15. The method of claim 1, wherein the amount of overlap between the first pixel and the first primitive is determined based on a depth of the first primitive and a depth of a second primitive of the plurality of primitives.

16. An apparatus for graphics processing, comprising:
a memory; and
at least one processor coupled to the memory and configured to:
calculate a center-edge distance of a first pixel of a plurality of pixels, the center-edge distance of the first pixel equal to a distance from a center of the first pixel to one or more edges of a first primitive of a plurality of primitives in a scene, wherein at least a portion of the first primitive overlaps the center of the first pixel;
determine whether a portion of the first pixel overlaps with at least one auxiliary primitive of the plurality of primitives;
calculate a distance from the center of the first pixel to one or more edges of the at least one auxiliary primitive when the portion of the first pixel overlaps with the at least one auxiliary primitive;
store the center-edge distance of the first pixel when the first primitive is visible in the scene;
determine an amount of overlap between the first pixel and the first primitive; and
blend a color of the first pixel with a color of a second pixel based on the center-edge distance of the first pixel, the amount of overlap between the first pixel and the first primitive, the distance from the center of the first pixel to the one or more edges of the at least one auxiliary primitive, and depth information for the first pixel and the second pixel, wherein the color of the first pixel is blended with the color of the second pixel for a portion of the first pixel that is outside of an area of the first pixel that overlaps with the first primitive, wherein the first pixel is adjacent to the second pixel.

17. The apparatus of claim 16, wherein the at least one processor is further configured to:
update the amount of overlap between the first pixel and the first primitive when the at least one auxiliary primitive forms a mesh with the first primitive.

18. The apparatus of claim 16, wherein the at least one processor is further configured to:
store the distance from the center of the first pixel to the one or more edges of the at least one auxiliary primitive in an auxiliary buffer when the portion of the first pixel overlaps with the at least one auxiliary primitive.

19. The apparatus of claim 16, wherein the at least one processor is further configured to:
determine whether a depth of the first primitive is less than or greater than a depth of a second primitive.

20. The apparatus of claim 16, wherein the at least one processor is further configured to:
determine whether the first primitive is visible in the scene.

21. The apparatus of claim 16, wherein the at least one processor is configured to store the center-edge distance of the first pixel in an edge buffer when the first primitive is visible in the scene.

22. The apparatus of claim 21, wherein the center-edge distance of the first pixel is compressed when configured to be stored in the edge buffer.

23. The apparatus of claim 16, wherein the amount of overlap between the first pixel and the first primitive is equal to the area of the first pixel that overlaps with the first primitive.

24. The apparatus of claim 16, wherein the color of the first pixel is equal to a color of the first primitive, and the color of the second pixel is equal to a color of a second primitive.

25. The apparatus of claim 16, wherein the at least one processor is configured to calculate a center-edge distance for each of the plurality of pixels when one of the plurality of primitives overlaps with the center of the pixel.

26. The apparatus of claim 16, wherein the one or more edges of the first primitive include at least one of a top edge, a bottom edge, a left edge, and a right edge.

27. The apparatus of claim 16, wherein the at least one processor is configured to calculate the center-edge distance of the first pixel in a rendering pass.

28. The apparatus of claim 16, wherein the plurality of primitives include a plurality of sub-pixel primitives.

29. The apparatus of claim 16, wherein the at least one processor is configured to determine the amount of overlap between the first pixel and the first primitive based on at least one of the center-edge distance of the first pixel or a center-edge distance of the second pixel, wherein the center-edge distance of the second pixel is equal to a distance from a center of the second pixel to one or more edges of a second primitive of the plurality of primitives.

30. The apparatus of claim 16, wherein the at least one processor is configured to determine the amount of overlap between the first pixel and the first primitive based on a depth of the first primitive and a depth of a second primitive of the plurality of primitives.

31. An apparatus for graphics processing, comprising:
means for calculating a center-edge distance of a first pixel of a plurality of pixels, the center-edge distance of the first pixel equal to a distance from a center of the first pixel to one or more edges of a first primitive of a plurality of primitives in a scene, wherein at least a portion of the first primitive overlaps the center of the first pixel;
means for determining whether a portion of the first pixel overlaps with at least one auxiliary primitive of the plurality of primitives;
means for calculating a distance from the center of the first pixel to one or more edges of the at least one auxiliary primitive when the portion of the first pixel overlaps with the at least one auxiliary primitive;
means for storing the center-edge distance of the first pixel when the first primitive is visible in the scene;
means for determining an amount of overlap between the first pixel and the first primitive; and
means for blending a color of the first pixel with a color of a second pixel based on the center-edge distance of the first pixel, the amount of overlap between the first pixel and the first primitive, the distance from the center of the first pixel to the one or more edges of the at least one auxiliary primitive, and depth information for the first pixel and the second pixel, wherein the color of the first pixel is blended with the color of the second pixel for a portion of the first pixel that is outside of an area of the first pixel that overlaps with the first primitive, wherein the first pixel is adjacent to the second pixel.

32. The apparatus of claim 31, further comprising:
means for updating the amount of overlap between the first pixel and the first primitive when the at least one auxiliary primitive forms a mesh with the first primitive.

33. The apparatus of claim 31, further comprising:
means for storing the distance from the center of the first pixel to the one or more edges of the at least one auxiliary primitive in an auxiliary buffer when the portion of the first pixel overlaps with the at least one auxiliary primitive.

34. The apparatus of claim 31, further comprising:
means for determining whether a depth of the first primitive is less than or greater than a depth of a second primitive.

35. The apparatus of claim 31, further comprising:
means for determining whether the first primitive is visible in the scene.

36. The apparatus of claim 31, wherein the center-edge distance of the first pixel is stored in an edge buffer when the first primitive is visible in the scene.

37. The apparatus of claim 36, wherein the center-edge distance of the first pixel is compressed when stored in the edge buffer.

38. The apparatus of claim 31, wherein the amount of overlap between the first pixel and the first primitive is equal to the area of the first pixel that overlaps with the first primitive.

39. The apparatus of claim 31, wherein the color of the first pixel is equal to a color of the first primitive, and the color of the second pixel is equal to a color of a second primitive.

40. The apparatus of claim 31, wherein a center-edge distance is calculated for each of the plurality of pixels when one of the plurality of primitives overlaps with the center of the pixel.

41. The apparatus of claim 31, wherein the one or more edges of the first primitive include at least one of a top edge, a bottom edge, a left edge, and a right edge.

42. The apparatus of claim 31, wherein the center-edge distance of the first pixel is calculated in a rendering pass.

43. The apparatus of claim 31, wherein the plurality of primitives include a plurality of sub-pixel primitives.

44. The apparatus of claim 31, wherein the amount of overlap between the first pixel and the first primitive is determined based on at least one of the center-edge distance of the first pixel or a center-edge distance of the second pixel, wherein the center-edge distance of the second pixel is equal to a distance from a center of the second pixel to one or more edges of a second primitive of the plurality of primitives.

45. The apparatus of claim 31, wherein the amount of overlap between the first pixel and the first primitive is determined based on a depth of the first primitive and a depth of a second primitive of the plurality of primitives.

46. A non-transitory computer-readable medium storing computer executable code for graphics processing, the code when executed by a processor causes the processor to:
calculate a center-edge distance of a first pixel of a plurality of pixels, the center-edge distance of the first pixel equal to a distance from a center of the first pixel to one or more edges of a first primitive of a plurality of primitives in a scene, wherein at least a portion of the first primitive overlaps the center of the first pixel;
determine whether a portion of the first pixel overlaps with at least one auxiliary primitive of the plurality of primitives;
calculate a distance from the center of the first pixel to one or more edges of the at least one auxiliary primitive when the portion of the first pixel overlaps with the at least one auxiliary primitive;
store the center-edge distance of the first pixel when the first primitive is visible in the scene;
determine an amount of overlap between the first pixel and the first primitive; and
blend a color of the first pixel with a color of a second pixel based on the center-edge distance of the first pixel, the amount of overlap between the first pixel and the first primitive, the distance from the center of the first pixel to the one or more edges of the at least one auxiliary primitive, and depth information for the first pixel and the second pixel, wherein the color of the first pixel is blended with the color of the second pixel for a portion of the first pixel that is outside of an area of the first pixel that overlaps with the first primitive, wherein the first pixel is adjacent to the second pixel.

* * * * *